United States Patent
Oberberger

(10) Patent No.: US 11,468,740 B2
(45) Date of Patent: Oct. 11, 2022

(54) REGULATED CASINO GAMES, METHODS AND COMPUTING DEVICES CONFIGURED TO ENABLE NON-WAGERING ACTIONS TO ENABLE OR INFLUENCE LATER-OCCURING WAGERS

(71) Applicant: AKKADIAN ENTERPRISES, Las Vegas, NV (US)

(72) Inventor: Michael M Oberberger, Spring Hill, TN (US)

(73) Assignee: AKKADIAN ENTERPRISES, Las Vegas, NV (US)

( * ) Notice: Subject to any disclaimer, the term of this patent is extended or adjusted under 35 U.S.C. 154(b) by 90 days.

(21) Appl. No.: 16/525,261

(22) Filed: Jul. 29, 2019

(65) Prior Publication Data

US 2021/0035411 A1    Feb. 4, 2021

(51) Int. Cl.
    *G07F 17/32*      (2006.01)
    *G06F 3/01*      (2006.01)
    *G06Q 50/34*      (2012.01)

(52) U.S. Cl.
    CPC .......... *G07F 17/3258* (2013.01); *G06F 3/013* (2013.01); *G06Q 50/34* (2013.01); *G07F 17/3211* (2013.01); *G07F 17/3262* (2013.01)

(58) Field of Classification Search
None
See application file for complete search history.

(56) References Cited

U.S. PATENT DOCUMENTS

| | | | |
|---|---|---|---|
| 6,609,978 B1 * | 8/2003 | Paulsen | G07F 17/32 463/42 |
| 2002/0017756 A1 * | 2/2002 | Kelly | G07F 17/32 273/138.1 |

(Continued)

OTHER PUBLICATIONS

International Search Report and Written Opinion of the International Searching Authority dated Dec. 8, 20020 in PCT/US2020/55098, 12 pages.

*Primary Examiner* — James S. McClellan
*Assistant Examiner* — Peter J Iannuzzi
(74) *Attorney, Agent, or Firm* — Young Law Firm, P.C.

(57) ABSTRACT

A computer-implemented method of operating a computing device, comprises enabling a player to play a wager-based game, the wager-based game being configured to present a plurality of wagering opportunities on a display, each of which being configured such that a player interaction therewith via a player interface generates a wager whose outcome is determined by a random process. First player interactions with at least some of the plurality of wagering opportunities may be received and corresponding wagers generated. Second player interactions with in-game items not associated with wagers may be received, the in-game items not associated with wagers having no present value to the player but having respective future potential values. During game play, it may be determined whether one or more predetermined in-game conditions are satisfied. When the one or more predetermined in-game conditions are satisfied, the user may be presented with a graphic mechanism configured to enable selection of one of the in-game items with which player interactions were received. One of the future potential values may then be randomly awarded to the player, the randomly awarded future potential value thereby becoming an awarded actual value.

18 Claims, 15 Drawing Sheets

(56) References Cited

U.S. PATENT DOCUMENTS

| | | |
|---|---|---|
| 2008/0076572 A1 | 3/2008 | Nguyen |
| 2011/0111842 A1 | 5/2011 | Walker |
| 2012/0094769 A1 | 4/2012 | Nguyen |
| 2014/0171184 A1 | 6/2014 | Cannon et al. |
| 2015/0018072 A1 | 1/2015 | Palchetti et al. |
| 2015/0287264 A1* | 10/2015 | De Viveiros Ortiz ................ G07F 17/3295 463/25 |
| 2016/0171827 A1 | 6/2016 | Washington et al. |
| 2016/0171835 A1 | 6/2016 | Washington et al. |
| 2016/0328915 A1 | 11/2016 | Cannon et al. |
| 2017/0076548 A1 | 3/2017 | Washington et al. |
| 2017/0076553 A1 | 3/2017 | Washington et al. |
| 2017/0323524 A1 | 11/2017 | Washington et al. |
| 2018/0082535 A1 | 3/2018 | Filipour et al. |
| 2018/0365928 A1* | 12/2018 | Froy .................. G07F 17/3206 |
| 2019/0102993 A1 | 4/2019 | Washington et al. |

* cited by examiner

REGULATED CASINO GAMES, METHODS AND COMPUTING DEVICES CONFIGURED TO ENABLE NON-WAGERING ACTIONS TO ENABLE OR INFLUENCE LATER-OCCURING WAGERS

BACKGROUND

Some regulated casino games include game play in which players are called upon to exhibit some measure of skill, judgment and/or dexterity in achieving one or more of the game's objectives. For example, the game's narrative may call on the player to shoot a large number of zombies or other enemies, to match a number of tiles or symbols, to drive around obstacles and like activities. In such games, each time the player takes aim and makes a kill shot, makes a match, drives around an obstacle or hits a target, a wager may be triggered. However, the entirely predictable and repeating cycle of player action triggering a wager does little to build anticipation and players may soon become disenchanted with such a mechanistic game play.

BRIEF DESCRIPTION OF THE DRAWINGS

FIG. 15 also shows exemplary tangible, non-transitory computer-readable media having data stored thereon representing sequences of instructions which, when executed by the regulated gaming computing device, cause a regulated gaming computing device or a general purpose computing device and/or mobile computing device to operate according to an embodiment.

DETAILED DESCRIPTION

Figure 1:
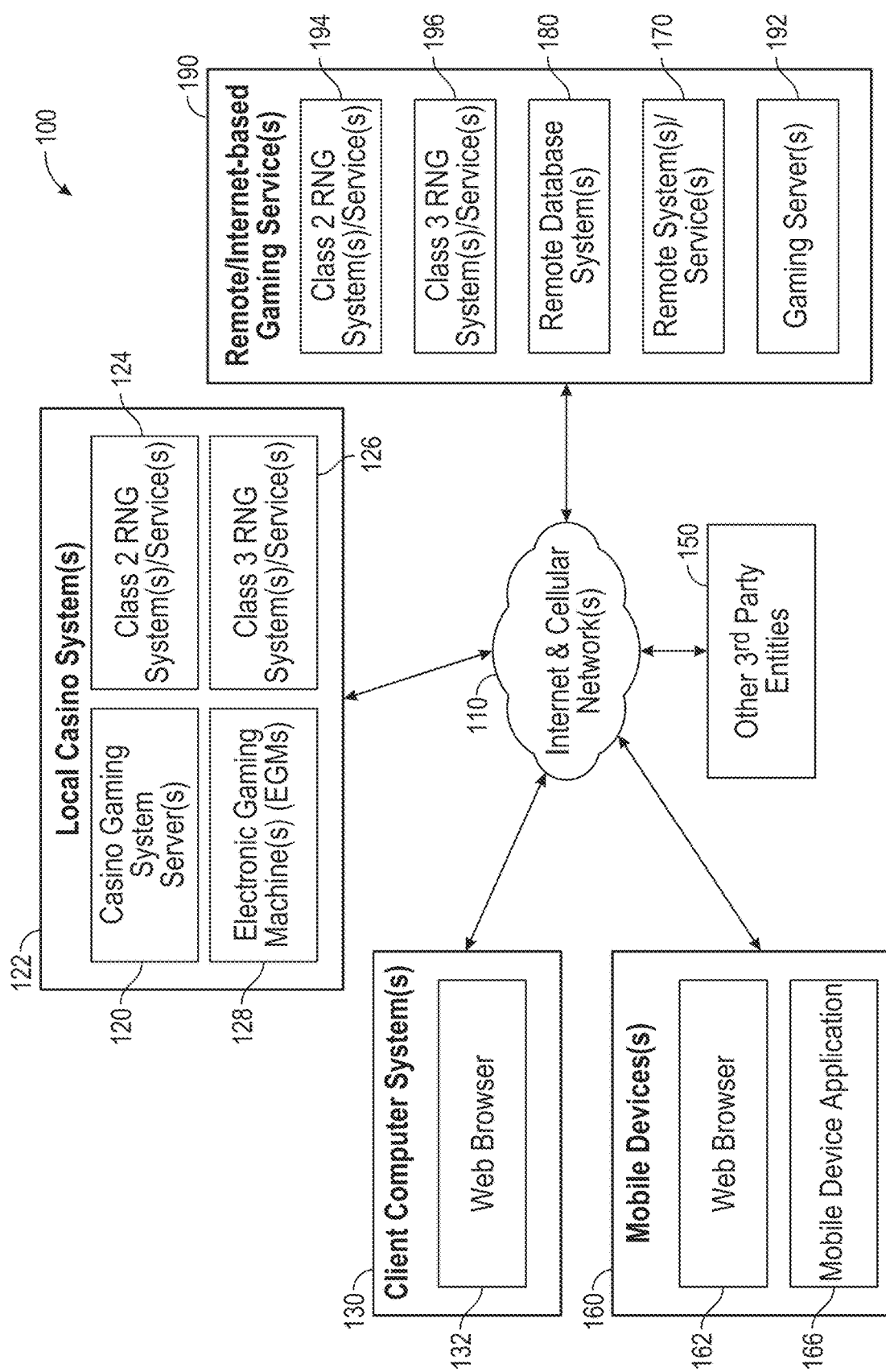
FIG. 1 illustrates a block diagram of a gaming network suitable for implementing embodiments.

Veteran gamblers (e.g., older gambler demographic age 50+) have been accustomed to a standard set of video gaming symbols (e.g., A, J, K, Q from playing cards) which, for example, may be accompanied with a multitude of additional themed symbols (e.g., fruits, animals, fantasy creatures, media personas, etc.) presented on a series of wheels or drums. Newer technology has made possible the use of digital display screens that present the reels and symbols in a digital format. Such existing slot machine technology, however, is dated and may be unappealing to younger players. Indeed, younger gamblers (e.g., also referred to as "gamers"), on the other hand, are accustomed to home gaming consoles (Nintendo, XBOX, PlayStation and the like) that provide them with exquisitely-rendered immersive 2D & 3D game environments with which they can interact. These gamers, who are used to fast paced, energetic, and visually stunning games, feel that the display method of the traditional slot machines are unappealing, which leads to decreased revenue for casino operators.

It is desirable, therefore, to offer hybrid arcade/wager-based games or gambling arcade games that provide hybrid arcade-style, wager-based gaming techniques, which find a ready demographic in younger gamers. However, one significant obstacle regarding such hybrid arcade-style, wager-based gaming techniques is that they often rely on complex back end solutions that require lengthy and costly processes of regulatory review and approvals in many different gaming jurisdictions.

One possible workaround to this significant obstacle is to configure/design a hybrid arcade-style, wager-based game such that it is compliant with currently approved wager-based gaming regulatory standards such as, for example, the well-known GLI standards, which have already been approved in various gaming jurisdictions. One example of a GLI standard is the GLI-11 standard version 3.0, Published Sep. 21, 2016 by Gaming Laboratories International, LLC, which is incorporated herein by reference.

For example, in one embodiment, a hybrid arcade-style, wager-based game may be configured to provide an arcade-style gaming interface which enables a player to participate in an arcade-style game at the wager-based gaming machine. One or more events and/or activities performed by the player (e.g., during play of the arcade-style game) may automatically trigger a random number generator (RNG)-based wager that is compliant with applicable gaming standards, rules and regulations. Because such wager-based activities comply with currently existing GLI standard(s) (and/or other national, regional, local gaming rules and regulations), such hybrid arcade-style, wager-based games may not require additional regulatory approval for deployment in casino venues.

In one embodiment, a hybrid arcade-style, wager-based game may be created by combining a new and different visual game representation with a new and different method of player interaction. The hybrid arcade-style, wager-based game may be configured to provide a perceptually stimulating experience using a wide variety of human interface devices (HID), based on the theme/style of the gambling game at hand. For example, some games may utilize a gun controller for first person shooter games, or steering wheels, accelerator and brake pedals for driving games. These and other types of games and interactions may be adapted for hybrid arcade/wager-based gaming.

For example, the format of the hybrid arcade-style, wager-based game may also focus on other types of video and/or arcade-style games such as, for example, non-linear (e.g., open world) type video and/or arcade-style games such as, for example, Grand Theft Auto, linear type video and/or arcade-style games such as, for example, Half-Life, massively multiplayer online "MMO" type video and/or arcade-style games such as, for example, World of Warcraft, role-playing game "RPG" type video and/or arcade-style games such as, for example, Final Fantasy, and/or others, Such games may feature a player character that may be moved through the game world via player input, (e.g., HID), which allows for an increased sense of excitement through gameplay by providing a multitude of player-choice possibilities through a wide-array of path directions.

In some embodiments, the format of the hybrid arcade-style, wager-based game may facilitate a gameplay environment in which multiplayer functionality takes place. The multiplayer gameplay may have multiple "enrollment" aspects in which one, for example, particular player could be on location at a casino playing a hybrid arcade/wager-based game, while another (e.g., different) player could be at a different location, concurrently participating in the same hybrid arcade/wager-based game, but without participating in any wagering aspect/portions of hybrid arcade/wager-based game. A non-wagering game such as this is commonly known as a "free to play" game, which the player is allowed to download and install on their own devices. The player may then progress through the game (e.g., which is very similar to its the wager-based counter-part) without taking part in wager-based events. Gaming situations such as these may promote a "clicks to bricks" outcome where a casino property promotes their games to home users and invites them to develop familiarity and expertise on non-wagering versions of the games. Later, those same home players may be invited to visit the casinos to play the hybrid arcade/wager version of the games.

In some embodiments, different players concurrently participating in the same hybrid arcade/wager-based game may each separately configure his/her respective wagering parameters/amounts, which may be different from the wagering parameters/amounts configured by other game player-participants.

FIG. 1 illustrates a block diagram of an embodiment of a hybrid arcade/wager-based gaming system 100 which may be implemented via a computer network. At least a portion of the various functions, actions, operations, and activities performed by one or more component(s) of the hybrid arcade/wager-based gaming system may be initiated in response to detection of one or more conditions, events, and/or other criteria satisfying one or more different types of minimum threshold criteria. According to embodiments, at least a portion of the various types of functions, operations, actions, and/or other features provided by the hybrid arcade/wager-based gaming system may be implemented at one or more client systems(s), at one or more system server(s), and/or combinations thereof. According to different embodiments, the present hybrid arcade/wager-based gaming system 100 may be implemented in hardware and/or combinations of hardware and software.

According to one embodiment, a hybrid arcade/wager-based gaming system 100 may include local casino system(s) 122, client computer systems 130, mobile devices 160 and remote/Internet-based gaming services 190 and other $3^{rd}$ party entities 150, coupled to a computer/communication network 110. The local casino system(s) 122 may include local casino gaming system server(s) 120. The local casino system(s) 122 may also include and class 2 RNG system(s)/service(s) 124. The Class 2 RNG system(s)/service(s) 124 may be configured to dynamically generate and/or provide Class 2 gaming type RNG outcomes to be used by hybrid arcade/wager-based Gaming devices as "predetermined" RNG outcome(s). Class 3 RNG system(s)/service(s) 126 may also be provided to dynamically generate and provide Class 3 gaming "predetermined" RNG outcome(s). Local casino system(s) 122 may also include electronic gaming machine(s) (EGMs) 128 that may be configured as described herein below.

Client computer system(s) 130 may also be operable to couple to the network 110 and implement various types of functions, operations, actions, and/or other features such as those described or referenced herein via, for example, a web browser 132. Similarly, mobile computing devices 160 (e.g., mobile phones, tablets and the like) may be configured to access the network 110 and to use a mobile web browser 162 and/or one or more mobile applications (apps) 166 to implement some or all of the functionality described herein. Third party entities 150 may also be configured to carry out some or all of the functionality described herein via the network 110.

Remote/Internet-based gaming service(s) 190 may also be coupled to network 110 and may comprise class 2 RNG system(s)/service(s) 194 as described relative to reference numeral 124, class 3 RNG system(s)/service(s) 196 as described relative to reference numeral 126, and remote database system(s) 180. Remote system(s)/service(s) 170 may be provided, which may include, for example, content provider servers/services, media streaming servers/services, database storage/access/query servers/services, financial transaction servers/services, payment gateway servers/services, electronic commerce servers/services, event management/scheduling servers/services and/or other services as needed. Remote/Internet-based gaming service(s) 190 may also include gaming servers 192.

According to embodiments, multiple instances or threads of hybrid arcade/wager-based gaming may be concurrently implemented and/or initiated via the use of one or more processors and/or other combinations of hardware and/or hardware and software. Embodiments may access and/or utilize information from one or more associated databases via communication with one or more local and/or remote memory devices.

According to different embodiments, various different types of encryption/decryption techniques may be used to facilitate secure communications over the network 110 and/or via other communication channels. For example, such encryption may utilize random number generators, SHA-1 (e.g., Secured Hashing Algorithm), MD2, MD5, DES (e.g., Digital Encryption Standard), 3DES (e.g., Triple DES), RC4 (e.g., Rivest Cipher), ARC4 (e.g., related to RC4), TKIP (e.g., Temporal Key Integrity Protocol, uses RC4), AES (e.g., Advanced Encryption Standard), RSA, DSA, DH, NTRU, and ECC (e.g., elliptic curve cryptography), PKA (e.g., Private Key Authentication), Device-Unique Secret Key and other cryptographic key data, SSL and/or others. Other security features may include use of well-known hardware-based and/or software-based security components, and/or any other known or yet to be devised security and/or hardware and encryption/decryption processes implemented in hardware and/or software.

Embodiments of hybrid arcade/wager-based gaming described herein may be implemented in hardware and/or a combination of both hardware and software. Possible implementations include in an operating system kernel, in a separate user process, in a library package bound into network applications, on a specially constructed machine, or on a network interface card. In a specific embodiment, various aspects described herein may be implemented in software such as an operating system or in an application running on an operating system.

Alternatively, hardware and/or software embodiments of present hybrid arcade/wager-based gaming techniques described herein may be implemented on a general-purpose programmable computer selectively activated or reconfigured by a computer program stored in memory. Such programmable machine may include, for example, mobile or handheld computing systems, PDA, smart phones, notebook computers, tablets, netbooks, desktop computing systems, system servers, cloud computing systems, network devices, etc.

Figure 2:
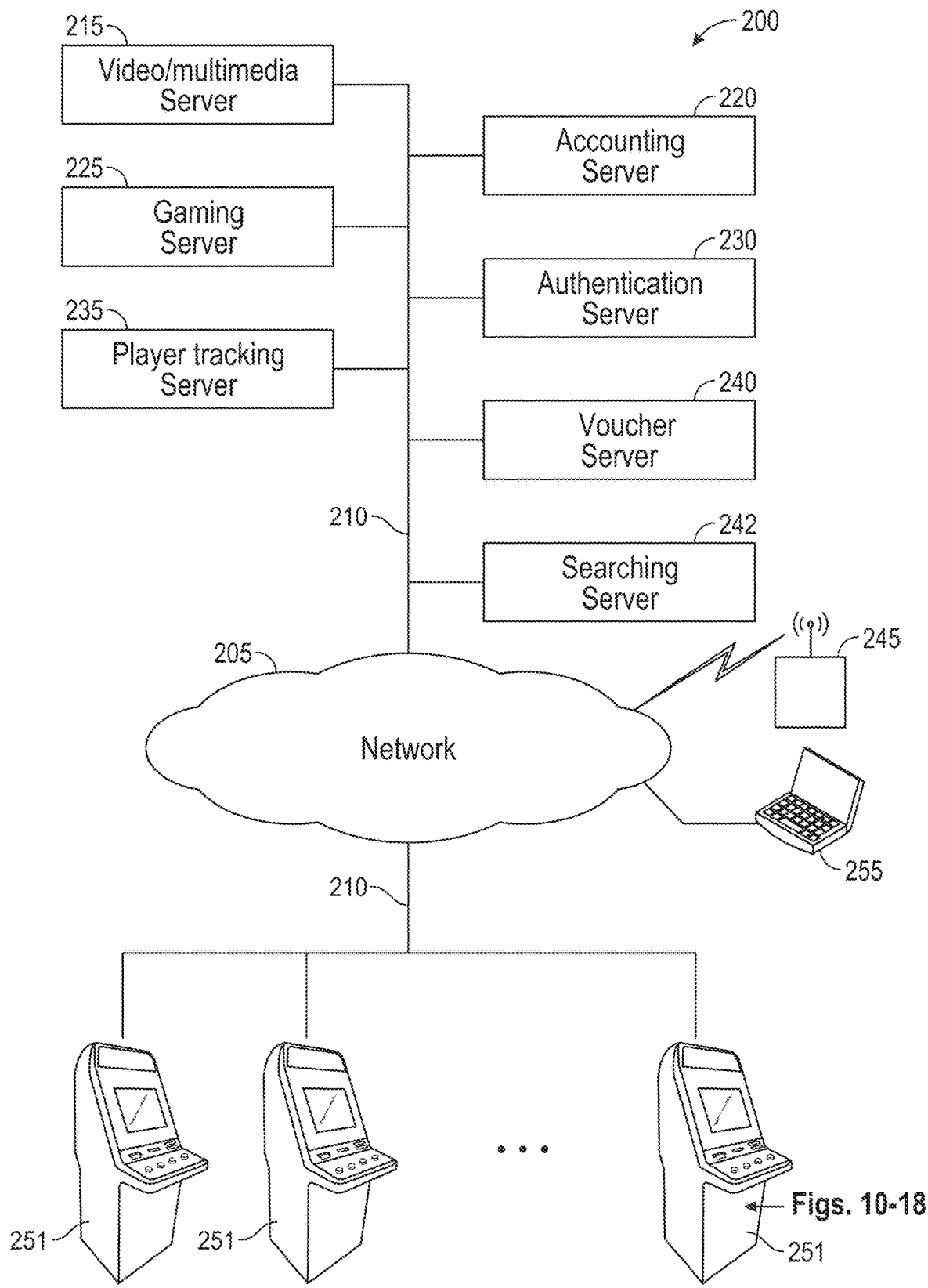
FIG. 2 shows a block diagram of an electronic gaming system according to one embodiment.

FIG. 2 shows an example block diagram of an electronic gaming system 200 according to one embodiment. As shown, electronic gaming system 200 may include electronic gaming devices (EGD) 251 (e.g., electronic gaming terminals, electronic gaming machines, wager-based video gaming machines, etc.), which may be coupled to network 205 via a network link 210. Network 205 may include the internet and/or a private network. One or more video streams may be received at video/multimedia server 215 from EGDs 251. Video/multimedia server 215 may also send one or more video streams to mobile devices 245, 255, EGDs 251, and/or other remote electronic devices. Video/multimedia server 215 may send these video streams via network link 210 and network 205.

Electronic gaming system 200 may include an accounting/transaction server 220, a gaming server 225, an authentication server 230, a player tracking server 235, a voucher server 240, and a searching server 242. The accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may also generate tax information relating to these wagers, generate profit/loss and/or other reports for predetermined gaming options, contingent gaming options, predetermined betting structures, and/or outcome categories. Gaming server 225 may generate gaming options based on predetermined betting structures and/or outcome categories. These gaming options may be predetermined gaming options, contingent gaming options, and/or any other gaming option disclosed herein. The authentication server 230 may determine the validity of vouchers, players' identity, and/or an outcome for a gaming event. The player tracking server 235 may track a player's betting activity, a player's preferences such as the player's preferred language, drinks, font, sound level, and the like. Based on data obtained by player tracking server 235, a player may be eligible for gaming rewards (e.g., free play), promotions, and/or other awards (e.g., complimentary food, drinks, lodging, concerts, etc.). Voucher server 240 may generate a voucher, which may include data relating to gaming options. The generated vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop-up window, a text message, an email, a voice message, a video message and the like. Searching server 242 may implement a wagering function, which may be an automatic wagering mechanism. These functions of searching server 242 may be integrated into one or more servers. Searching server 242 may be configured to, for example, determine which games paid out the most money during a time period, which games kept the most money from players during a time period, which games are most popular (e.g., top games), which games are least popular, which games have the most amount of money wager during a period, which games have the highest wager volume, which games are more volatile (e.g., volatility, or deviation from the statistical norms, of wager volume, wager amount, pay out, etc.) during a time period, and the like. Search may also be associated with location queries, time queries, and/or people queries.

According to embodiments, the gaming network 300 may include a display system server(s) 304 configured manage content (e.g., graphics, images, text, video fees, etc.) to be displayed and/or presented at one or more EGDs, dealer displays, administrator displays, etc. One or more EGD multimedia system server(s) 305 may be provided and coupled to network 310 and configured to manage content (e.g., graphics, images, text, video fees, audio feeds, etc.), which, for example, is to be streamed or provided to one or more EGDs (e.g., or to one or more groups of EGDs). One or more messaging system server(s) 306 may be provided and coupled to network 310 and configured for the management of messaging and/or other communications among and between the various systems, components, devices, EGDs, players, dealers, and administrators of the gaming network. mobile system server(s) 308 may manage communications and/or data exchanged with various types of mobile devices such as player-managed mobile devices (e.g., smart phones, PDAs, tablets, mobile computers), casino-managed mobile devices (e.g., mobile gaming devices). financial system server(s) 312 may be configured to track, manage, report and store financial data and financial transactions relating to one or more hybrid arcade/wager-based game sessions. According to one embodiment, a player tracking system server 314 may include at least one database that tracks each player's hands, wins/losses, bet amounts, player preferences, etc., in the network. In one implementation, the presenting and/or awarding of promotions, bonuses, rewards, achievements, etc., may be based on a player's play patterns, time, games selected, bet amount for each game type, etc. A player tracking system server may also help establish a player's preferences, which assists the casino in their promotional efforts to: award player comps (e.g., loyalty points); decide which promotion(s) are appropriate; generate bonuses and the like. Data tracking & analysis system(s) 318 may be configured to manage and analyze game data. In one embodiment, the data tracking & analysis system(s) may be configured to aggregate multisite hybrid arcade/wager-based gaming trends, local wins and jackpots.

Gaming system server(s) 322, 324 may each be dedicated to one or more specifically designated type(s) of game(s). Each game server may include game logic to host one of more virtual hybrid arcade/wager-based game sessions. At least some game server(s) may also be configured to track of the game accounting (e.g., money in, money out) for a virtual hybrid arcade/wager-based game being played, and/or for updating the financial system servers 312 at the end of each game. The game server(s) 322, 324 may also configured to generate the EGD graphics primitives (e.g., game virtual objects and game states), and may further be operable to update EGDs when a game state change (e.g., new card dealt, player upped the ante, player folds/busts, etc.) is detected. Jurisdictional/regulatory monitoring & enforcement system(s) 350 may be configured to handle tracking, monitoring, reporting, and enforcement of specific regulatory requirements relating to wager-based gameplay activities in one or more jurisdictions.

Authentication & validation system(s) 352 may be configured to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the authentication & validation system(s) 352 may be configured to authenticate and/or validate various types of hardware and/or software components, such as, for example, hardware/software components residing at a remote EGDs, game play information, wager information, player information and/or identity, etc.

Figure 3:
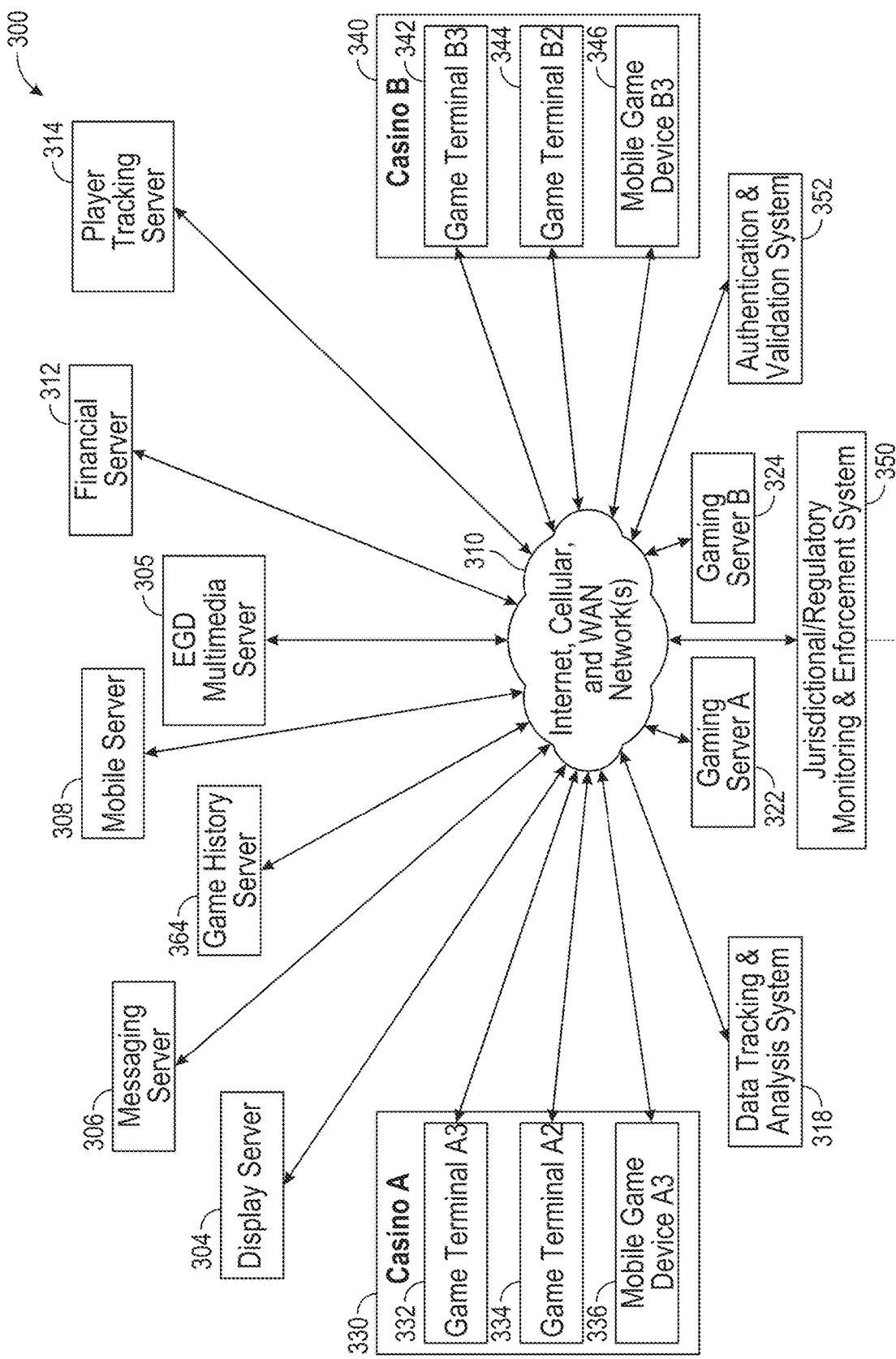
FIG. 3 illustrates a network diagram of gaming network that may be configured to implement embodiments described herein.

Casino venues, shown in FIG. 3 as Casino A 330 and Casino B 340, may correspond to a real-world, physical casino located at a particular geographic location. In some embodiments, a portion of the multiple different casino venues may be affiliated with one another (e.g., Harrah's Las Vegas, Harrah's London). In other embodiments, at least a portion of the multiple different casino venues do not share any affiliation with each other.

EGDs 332, 334, 336, 342, 344, 346 may be configured to enable players to participate in game sessions according to embodiments. Different EGDs may be physically located in one or more different casino venues and may be connected via a communication network such as shown at 310 in FIG. 3, which may include Internet, Cellular, and WAN Network(s). In some embodiments, EGDs may be implemented as stationary machines. In some embodiments, at least some EGDs may be implemented using mobile devices (e.g., tablets, smartphones, laptops, PC's, and the like).

Game history server(s) 364 may be provided. Game history servers 364 may be configured to track game types and game play history for hybrid arcade/wager-based games. In some embodiments, a game history server may also assist the casino manager in case of disputes between players and the casino by, for example, providing the ability to "replay" (e.g., by virtually recreating the game events) the game in dispute, step by step, based on previously stored game states. Remote database system(s) may be coupled to network 310 and selectively accessible and may be configured to store and provide access to various types of information and data described herein. Remote system server(s)/service(s) may be provided, and configured to provide, for example, content provider servers/services media streaming servers/services database storage/access/query servers/services, financial transaction servers/services, payment gateway servers/services, electronic commerce servers/services, event management/scheduling servers/services and/or other services. Mobile Game Device(s) 336, 346 may be configured to provide the services described below relative to FIG. 6.

According to specific embodiments, a variety of different game states may be used to characterize the state of current and/or past events which are occurring (e.g. or have occurred) at a given EGD. For example, in one embodiment, at any given time in a game, a valid current game state may be used to characterize the state of game play (e.g., and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

A variety of different entities may be used (e.g., either singly or in combination) to track the progress of game states which occur at a given gaming EGD. Examples of such entities may include a master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

Local game tracking components at the EGD may be operable to automatically monitor game play activities at the EGD, and/or to automatically identify key events which may trigger a transition of game state from one state to another as a game progresses. Depending upon the type of game being played at the gaming table, examples of possible key events may include the start of a new gaming session; the end of a current gaming session; the start of a virtual slot wheel spin; a game start event; a game end event; the detection of an event that triggers the initiation of wager-based event (e.g., killing a zombie, carrying out a predetermined action upon encountering a wagering opportunity, and the like); the detection of event that triggers the end of a wager-based event; the detection of event that triggers the initiation or end of a randomized game play event; an initial wager period start or end; a subsequent wager period start or end; or a payout period start or end.

Figure 4:
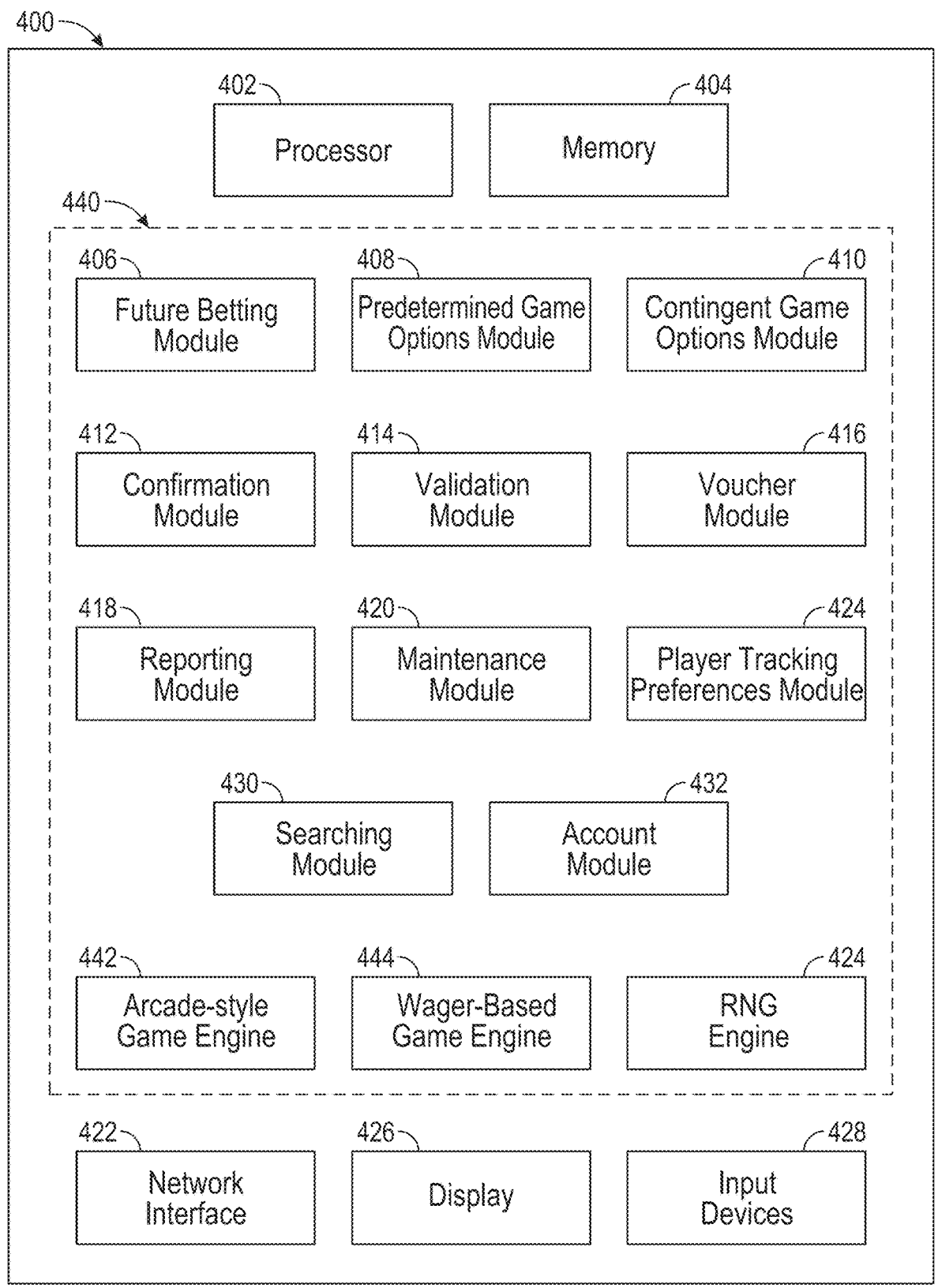
FIG. 4 is a block diagram of electronic gaming device, according to an embodiment.

FIG. 4 shows a block diagram 400 of electronic gaming device 400 according to one embodiment. As shown, electronic gaming device 400 may include a processor 402, a memory 404, a network interface 422, input devices 428, and a display 426. Processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options. The processor 402 may offer a gaming option that is structured so that the gaming option relates to more than one EGD. Processor 402 may generate contingent gaming options and/or predetermined gaming options. Contingent gaming options 410 may be structures configured such that a wager is activated when a triggering event occurs.

Network interface 422 may be configured to enable the electronic gaming device 400 to communicate with remote devices/systems such as, for example, video/multimedia server(s), accounting/transaction server(s), gaming server(s), authentication server(s), player tracking server(s), voucher server(s) over a communication network, such as shown at 110, 205 and 310. Input devices 428 may be or include mechanical buttons, electronic buttons, one or more touchscreens, microphones, cameras, optical scanners, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select type of content to be displayed on main and/or auxiliary screen(s) of EGD, or any combination thereof.

Arcade-style game engine 442 may be configured to manage the arcade-style game play portion (or entertainment portion) of the hybrid arcade/wager-based game. In contrast, a wager-based game engine 444 may be configured to manage the wager-based game event portion(s) of games according to embodiments. A Random Number Generator (RNG) Engine 446 may be provided and may include software and/or hardware algorithm and/or processes which are used to generate random outcomes and may be used by the wager-based game engine to generate wager-based game event outcomes.

Display 426 may show video streams from one or more gaming devices, gaming objects from one or more gaming devices, computer generated graphics, predetermined gaming options, and/or contingent gaming options. The memory 404 may include various memory modules 440, including a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options and/or contingent gaming options. Any other processor (e.g., gaming server 225, any virtualized gaming server, etc.) may implement the functions of processor 402. Predetermined game options module 408 may store data relating to predetermined gaming options, which may be offered to a player. The contingent game options module 410 may store data relating to contingent gaming options, which may be offered to a player. The confirmation module 412 may utilize data received from a voucher, the transaction history of the voucher (e.g., in the case in which the voucher changed hands in a secondary market), and/or the identity of the player to confirm the value of the voucher. In another example, confirmation module 412 may utilize game event data, along with voucher data to confirm the value of the voucher. A validation module 414 may utilize data received from a voucher to confirm the validity of the voucher. Voucher module 416 may store data relating to generated vouchers, redeemed vouchers, bought vouchers, and/or sold vouchers. Reporting module 418 may generate reports related to a performance of electronic gaming device 400, electronic gaming system(s), hybrid arcade/wager-based game(s), video streams, gaming objects, credit device(s) or identification device(s), for example.

In one implementation, reporting module 418 may reside on a central server and may be configured to aggregate and generate real time statistics on betting activities at one or more hybrid arcade/wager-based games at one or more participating casinos. The aggregate betting statistics may include trends (e.g., aggregate daily wager volume and wager amount by game types, by casinos, and the like), top games with the most payouts, top tables with the most payouts, top search structures used by players, most popular hybrid arcade/wager-based game(s) by wager volume, most searched for game, hybrid arcade/wager-based game(s) with least payouts, weekly trends, monthly trends, and other statistics related to game plays, wagers, people, location, and searches.

Maintenance module 420 may track any maintenance that is implemented on electronic gaming device 400 and/or electronic gaming system 200. Maintenance module 420 may schedule preventative maintenance and/or request a service call based on a device error. The player tracking preferences module 424 may compile and track data associated with a player's preferences.

Searching module 430 may include one or more searching structures, one or more searching algorithms, and/or any other searching mechanisms. In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In another example, the searching structures may be based on one or more specific games. In another example, the searching structure may be based on a player's preferences, past transactional history, player input, a hybrid arcade/wager-based game or game type, a particular EGD, a particular casino, a particular location within a casino, game outcomes over a time period, payout over a time period, and/or any other criteria. Searching algorithms may be dynamic searching programs, which may be modified based on one or more past results, as described previously. In another example, the search algorithm may generate a search priority based on the probability of success various events and/or conditions. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information. Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 400 may reside locally in gaming terminal 400. However, in at least some embodiments, at least part of the functions performed by these modules may be implemented in one or more remote servers. For instance, modules 406-420 and 424 may each be on a remote server, communicating with gaming terminal 400 via a network interface such as Ethernet in a local area network (LAN) or a wide area network (WAN) topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. Gaming terminal 400 would make service requests over the web for the available predetermined wager options to be displayed. Regardless of how the modules and their respective functions are implemented, the interoperability with the gaming terminal 400 is seamless. In one implementation, reporting module 418 may reside on a central server and may be configured to aggregate and generate real time statistics on betting activities at one or more hybrid arcade/wager-based games at one or more participating casinos. The aggregate betting statistics may include trends (e.g., aggregate daily wager volume and wager amount by game types, by casinos, and the like), top games with the most payouts, top EGDs with the most payouts, top search structures used by players, most popular hybrid arcade/wager-based game(s) by wager volume, most searched for game(s), EGDs with least payouts, weekly trends, monthly trends, and other statistics related to game plays, wagers, people, location, and searches.

Figure 5:
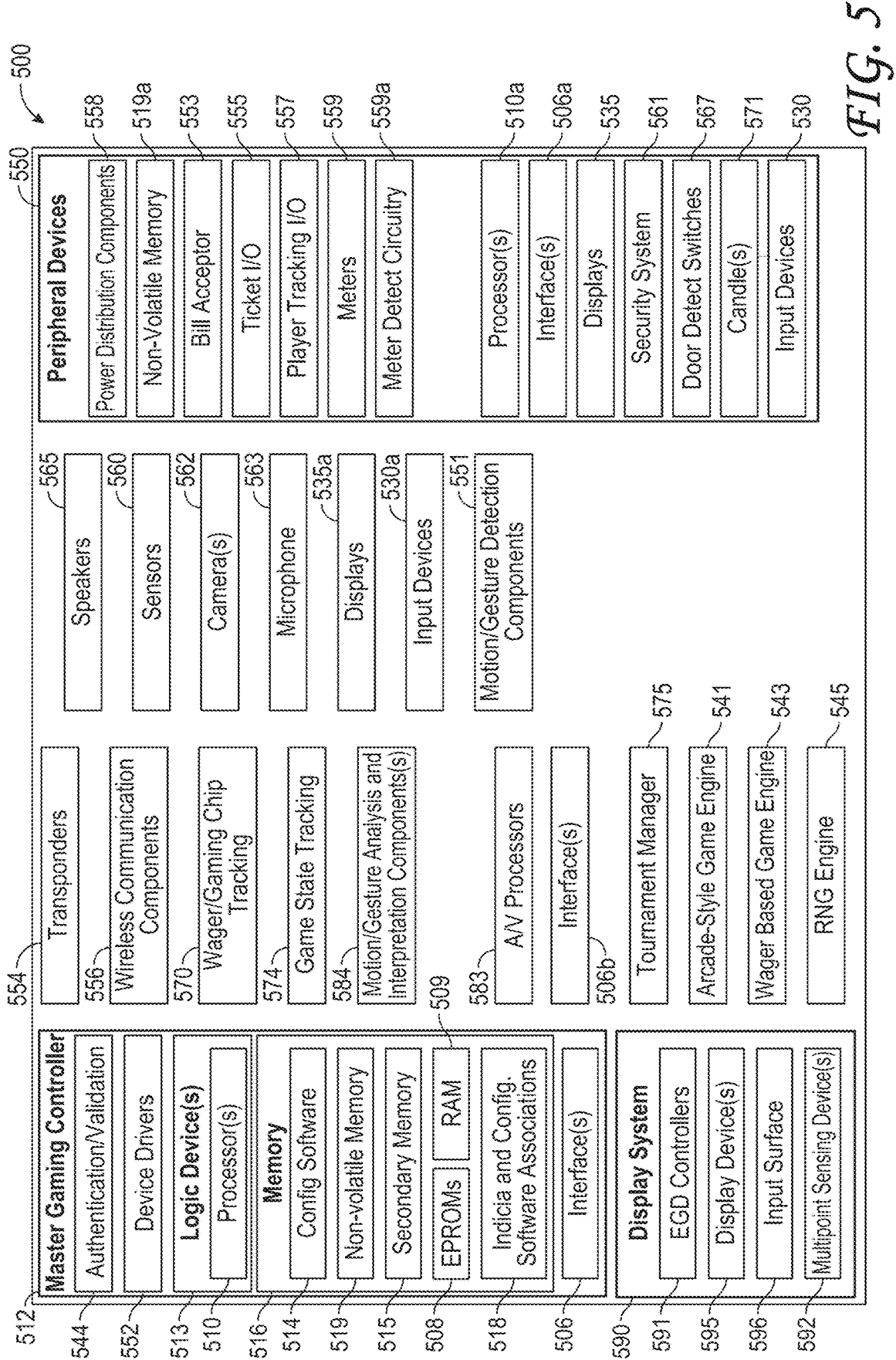
FIG. 5 is a block diagram of an intelligent electronic gaming system, according to one embodiment.

FIG. 5 is a block diagram of an exemplary intelligent multi-player electronic gaming system 500 according to one embodiment. Gaming system 500 may be implemented as a gaming server or as an electronic gaming machine (e.g., EGM) or electronic gaming device (e.g., EGD).

As shown, gaming system 500 may include at least one processor 510, at least one interface 506, and memory 516. Additionally, gaming system 500 may include at least one master gaming controller 512, a multi-touch sensor and display system 590, a plurality of peripheral device components 550, and various other components, devices, systems such as, for example, arcade-style game engine(s) 541; wager-based game engine(s) 543; RNG engine(s) 545; transponders 554; wireless communication components 556; gaming chip/wager token tracking components 570; games state tracking components 574; motion/gesture analysis and interpretation components 584, and audio/video processors 583 which, for example, may include functionality for detecting, analyzing and/or managing various types of audio and/or video information relating to various activities at the gaming system. Various interfaces 506b may be provided for communicating with other devices, components and systems, as may be tournament manager 575; sensors 560; one or more cameras 562; one or more microphones 563; secondary display(s) 535a; input devices 530a; motion/gesture detection components 551; and peripheral devices 550.

The arcade-style game engine(s) 541 may be configured to manage the arcade-style game play portion (or entertainment portion) of the hybrid arcade/wager-based game. Conversely, the wager-based game engine(s) 543 may be configured to manage the wager-based game event portion(s) of the hybrid arcade/wager-based game. RNG engine(s) 545 may include software and/or hardware algorithm and/or processes used to generate random outcomes and may be used by the wager-based game engine to generate wager-based game event outcomes. Monetary payout manager 522 may be configured or designed to include functionality for determining the appropriate monetary payout(s) (if any) to be distributed to player(s) based on the outcomes of the wager-based game events which are initiated during play of one or more hybrid arcade/wager-based games. The non-monetary payout manager 524 may be configured to include functionality for determining the appropriate non-monetary payout(s) (if any) to be awarded or distributed to player(s) based on the outcomes of the wager-based game events which are initiated during play of one or more hybrid arcade/wager-based games.

One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (e.g., or another person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include EGD controllers 591; multipoint sensing device(s) 592 (e.g., multi-touch surface sensors/components); display device(s) 595; and Input/touch surface 596. According to embodiments, display surface(s) 595 may include one or more display screens. Master gaming controller 512 may include authentication/validation components 544; device drivers 552; logic devices 513, which may include one or more processors 510; memory 516, which may include configuration software 514, non-volatile memory 519, EPROMS 508, RAM 509, associations 518 between indicia and configuration software, and interfaces 506.

In at least one embodiment, the peripheral devices 550 may include power distribution components 558; non-volatile memory 519a (e.g., and/or other types of memory); bill acceptor 553; ticket I/O 555; player tracking I/O 557; meters 559 (e.g., hard and/or soft meters); meter detect circuitry 559a; processor(s) 510a; interface(s) 506a; display(s) 535; independent security system 561; door detect switches 567; candles, etc. 571; input devices 530, for example.

In one implementation, processor 510 and master gaming controller 512 may be included in a logic device 513 enclosed in a logic device housing. The processor 510 may include any conventional processor or logic device configured to execute software (i.e., sequences of computer-readable instructions to be executed) allowing various tasks such as communicating with a remote source via communication interface 506, such as a server that stores authentication information or games; converting signals read by an interface to a format corresponding to that used by software or memory in the gaming system; accessing memory to configure or reconfigure game parameters in the memory according to indicia read from the device; communicating with interfaces, various peripheral devices and/or I/O devices; operating peripheral devices such as, for example, card readers, paper ticket readers, etc.; operating various I/O devices such as, for example, displays 535 and input devices 530. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic and/or chip-card card readers commercially available for reading a player-specific identification information. The player-specific information can be provided on specially constructed magnetic cards issued by a casino, or magnetically coded credit cards or debit cards frequently used with national credit organizations such as Visa, MasterCard, American Express, or banks and other institutions.

The gaming system may include other types of participant identification mechanisms which may use a fingerprint image, eye blood vessel image reader, or other suitable biometric information to confirm identity of the player. Such personalized identification information could also be used to confirm credit use of a smart card, transponder, and/or player's personal player input device (e.g., UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 4) a secondary memory storage device 515 such as a non-volatile memory device, configured to store gaming software related information (e.g., the gaming software related information and memory may be used to store various audio files and games not currently being used and invoked in a configuration or reconfiguration); 5) communication transport protocols (e.g., such as, for example, TCP/IP, USB, Firewire, 1EEE1394, Bluetooth, IEEE 802.11x (e.g., IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (e.g., a proprietary protocol developed by IGT, Reno, Nev.).

A plurality of device drivers 552 may be stored in memory 516. Example of different types of device drivers may include device drivers for gaming system components, device drivers for gaming system components, etc. The device drivers 552 may utilize a communication protocol of some type that enables communication with a particular physical device. The device driver abstracts the hardware implementation of a device. For example, a device driver may be written for each type of card reader that may be potentially connected to the gaming system. Examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (e.g., Wi-Fi), etc. When one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

The software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device.

As another example, when the memory 516 includes a CD/DVD drive including a CD/DVD designed or configured to store game options, parameters, and settings, the software stored in the memory may be upgraded by replacing a second CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. One or more of the memory devices, such as the hard-drive, may be employed in a game software download process from a remote software server.

The gaming system 500 may also include various authentication and/or validation components 544 which may be used for authenticating/validating specified gaming system components such as, for example, hardware components, software components, firmware components, information stored in the gaming system memory 516, etc.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone and/or detecting (e.g., in real time) the presence and/or monetary amount of gaming chips which are within the player's personal space, for example. In one implementation, at least a portion of the sensors 560 and/or input devices 530 may be implemented in the form of touch keys selected from a wide variety of commercially available touch keys used to provide electrical control signals. Alternatively, some of the touch keys may be implemented by a touch-screen display. For example, in at least one implementation, the gaming system player may include input functionality for enabling players to provide their game play decisions/instructions (e.g., and/or other input) to the EGD using the touch keys and/or other player control sensors/buttons. Additionally, such input functionality may also be used for allowing players to provide input to other devices in the casino gaming network (e.g., such as, for example, player tracking systems, side wagering systems, etc.)

Wireless communication components 556 may include one or more communication interfaces having different architectures and utilizing a variety of protocols such as, for example, 802.11 (e.g., Wi-Fi), 802.15 (e.g., including Bluetooth™), 802.16 (e.g., WiMAX), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information. An example of a near-field communication protocol is the ECMA-340 "Near Field Communication—Interface and Protocol (e.g., NFCIP-1)", published by ECMA International (e.g., www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

A motion/gesture detection component(s) 551 may be configured or designed to detect player movements and/or gestures and/or other input data from the player. In some implementations, each gaming system may have its own respective motion/gesture detection component(s). In other embodiments, motion/gesture detection component(s) 551 may be implemented as a separate sub-system of the gaming system which is not associated with any one specific gaming system or device.

Figure 6:
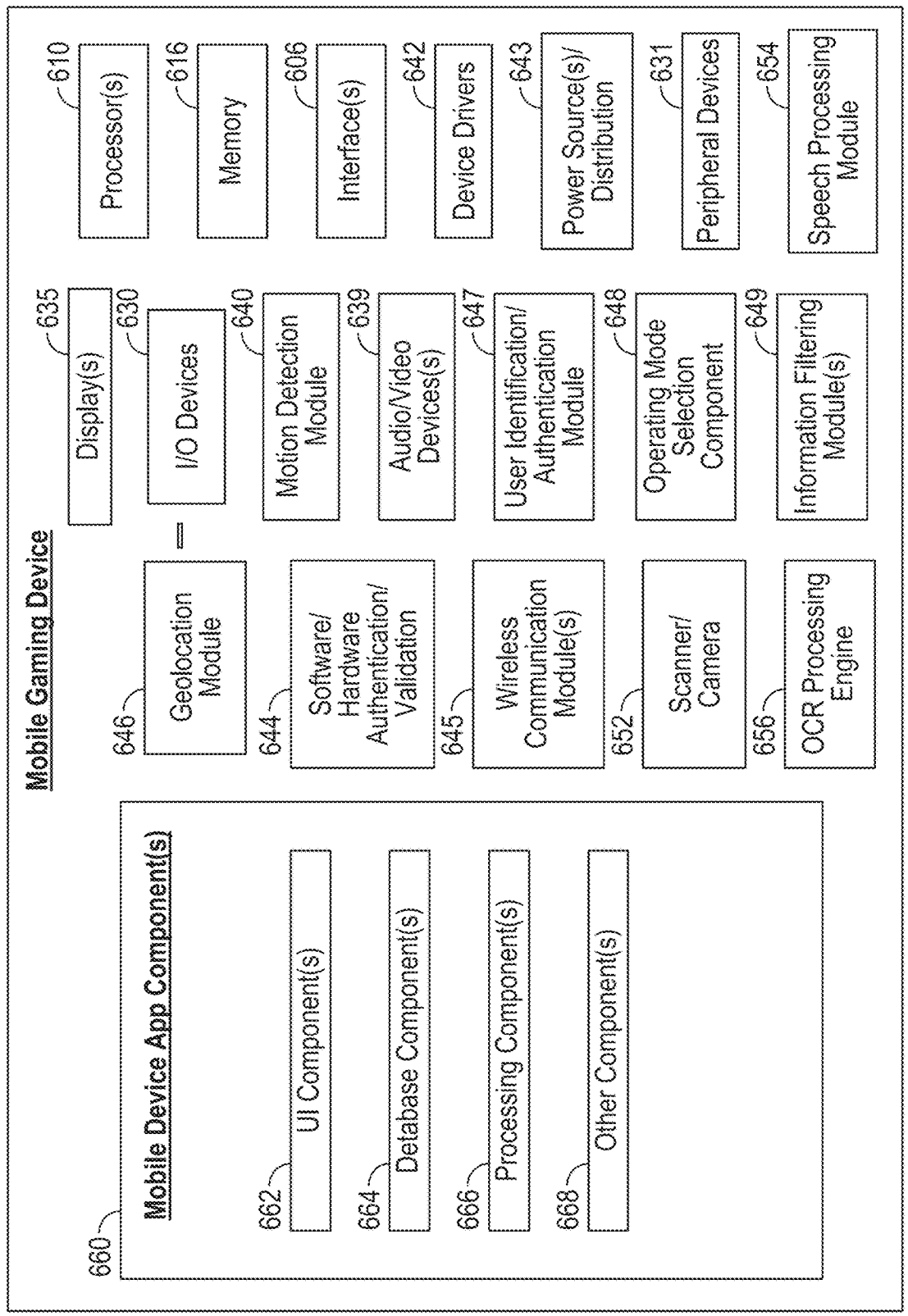
FIG. 6 is a block diagram of a mobile gaming device with which an embodiment may be practiced.

FIG. 6 is a block diagram of an exemplary mobile gaming device 600 in accordance with a specific embodiment. In at least one embodiment, one or more players may participate in a game session using mobile gaming devices. In at least some embodiments, the mobile gaming device may be configured or designed to include or provide functionality which is similar to that of an electronic gaming device (e.g., EGD) such as that described, for example, in FIG. 4.

As shown in FIG. 6, mobile gaming device 600 may include mobile device application components (e.g., 660), which, for example, may include UI components 662; database components 664; processing components 666 and/or other components 668 which, for example, may include components for facilitating and/or enabling the mobile gaming device to carry out the functionality described herein.

The mobile gaming device 600 may include mobile device app component(s) that have been configured or designed to provide functionality for enabling or implementing at least a portion of the functionality of the hybrid arcade/wager-based game techniques at the mobile gaming device.

According to embodiments, various aspects, features, and/or functionalities of the mobile gaming device may be performed, implemented and/or initiated by processor(s) 610; device drivers 642; memory 616; interface(s) 606; power source(s)/distribution 643; geolocation module 646; display(s) 635; I/O devices 630; audio/video devices(s) 639; peripheral devices 631; motion detection module 640; user identification/authentication module 647; client app component(s) 660; other component(s) 668; UI Component(s) 662; database component(s) 664; processing component(s) 666; software/hardware authentication/validation 644; wireless communication module(s) 645; information filtering module(s) 649; operating mode selection component 648; speech processing module 654; scanner/camera 652 and/or OCR processing engine 656, for example.

Figure 7:
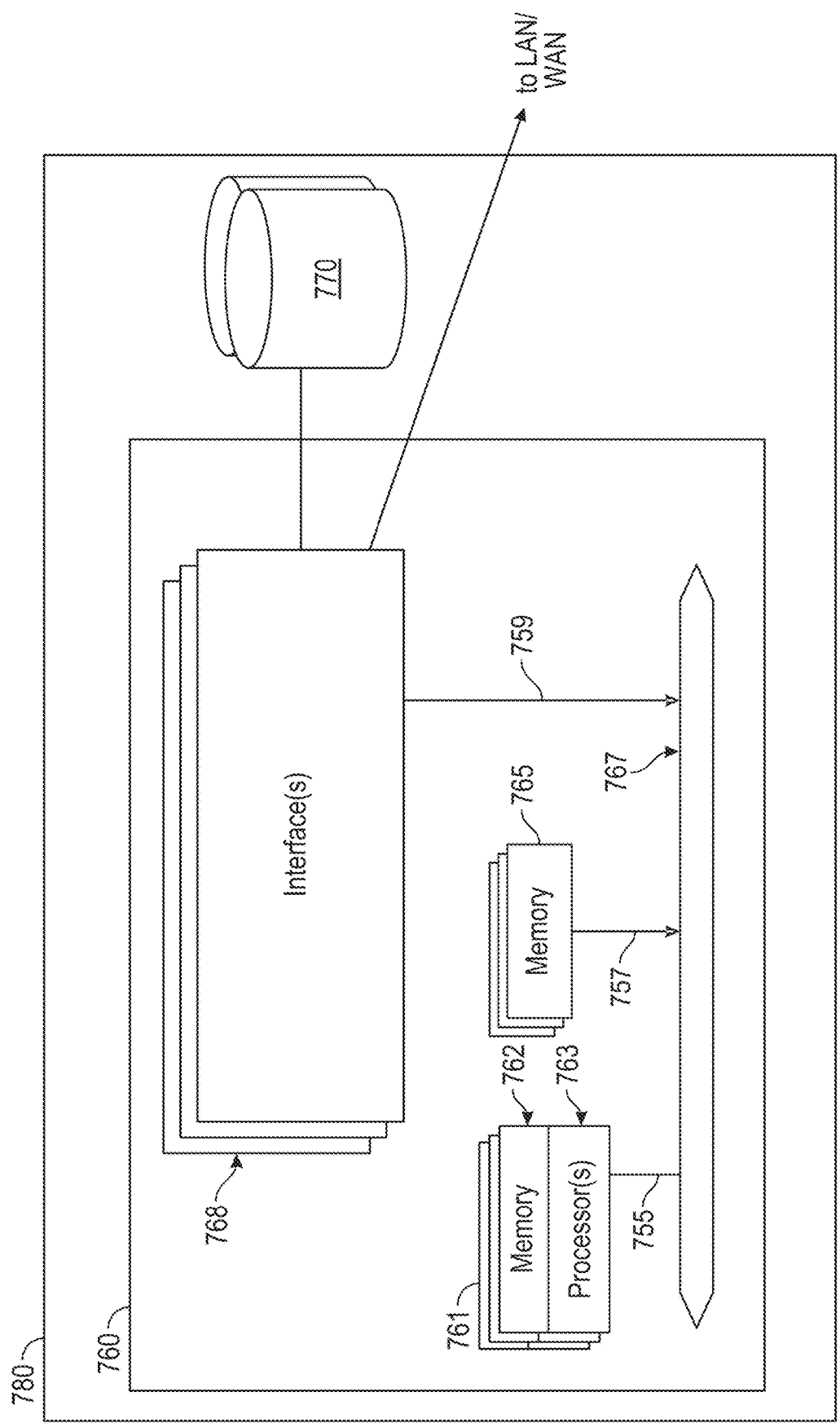
FIG. 7 shows a system server suitable for implementing various aspects of embodiments described herein.

FIG. 7 shows a system server 780 that may be configured according to embodiments. The system server 780 may include at least one network device 760, and at least one storage device 770 (e.g., such as, for example, a direct attached storage device). In one embodiment, system server 780 may be configured to implement at least some of the hybrid arcade/wager-based game techniques described herein. Network device 760 may include a master central processing unit (e.g., CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g., Linux), and any appropriate system software (e.g., such as, for example, AppLogic (e.g., TM) software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (e.g., such as non-volatile RAM and/or ROM) also forms part of CPU 762. However, there are different ways in which memory could be coupled to the system. Memory block 761 may be used for a variety of purposes such as, for example, caching and/or storing data, programming instructions, etc.

Interfaces 768 may be typically provided as interface cards. Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, InfiniB and interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (e.g., Wi-Fi) interfaces, 802.15 interfaces (e.g., including Bluetooth™) 802.16 (e.g., WiMAX) interfaces, 802.22 interfaces, Cellular standards such as CDMA interfaces, CDMA2000 interfaces, WCDMA interfaces, TDMA interfaces, Cellular 3G interfaces, and the like.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communication-intensive tasks, these interfaces allow the master microprocessor 762 to efficiently perform routing computations, network diagnostics or security functions.

In at least one embodiment, some interfaces may be configured or designed to allow the system server 780 to communicate with other network devices associated with various local area network (e.g., LANs) and/or wide area networks (e.g., WANs). Other interfaces may be configured or designed to allow network device 760 to communicate with one or more direct attached storage device(s) 770.

Regardless of network device's configuration, it may employ one or more memories or memory modules (e.g., such as, for example, memory block 765, which, for example, may include random access memory (e.g., RAM)) configured to store data, program instructions, logic and processes for the general-purpose network operations and/or other information relating to the functionality of the embodiments described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (e.g., ROM) and random-access memory (e.g., RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
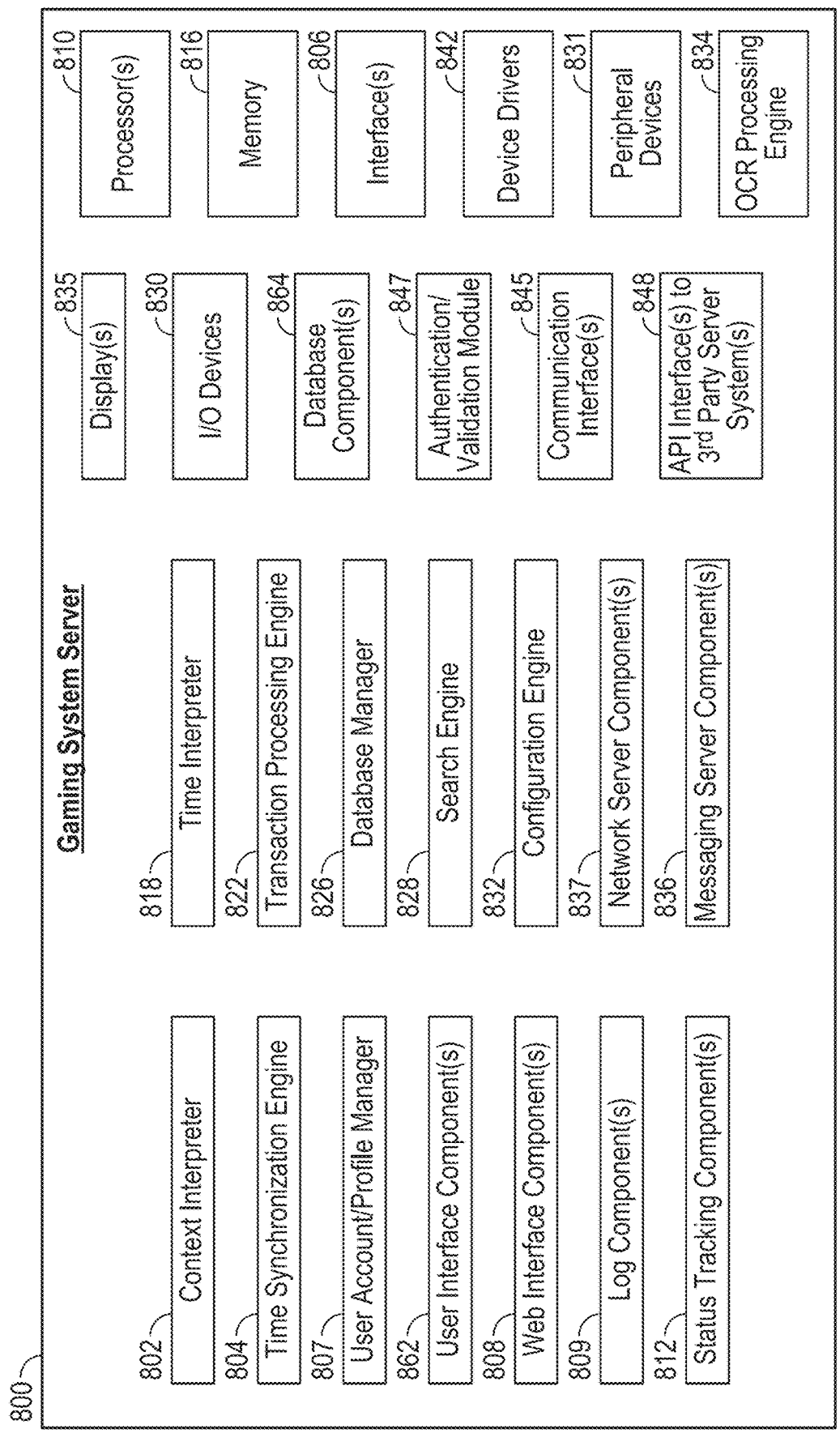
FIG. 8 shows a functional block diagram of a gaming system server according to one embodiment.

FIG. 8 illustrates an example of a functional block diagram of a gaming system server in accordance with a specific embodiment. As shown, the gaming system server 800 may a context interpreter 802 which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). Examples of contextual criteria which may be analyzed may include, but are not limited to, for example, location-based criteria (e.g., geolocation of mobile gaming device, geolocation of EGD, time-based criteria, identity of user(s), user profile information, transaction history information and recent user activities, for example. Time synchronization engine 804 may be operable to manage universal time synchronization (e.g., via NTP and/or GPS). The search engine 828 may be operable to search for transactions, logs, game history information, player information, hybrid arcade/wager-based game information, etc., which may be accessed from one or more local and/or remote databases. The gaming system server 800 may also include a configuration engine 832 that may be configured to determine and handle configuration of various customized configuration parameters for one or more devices, component(s), system(s), and process(es). Time interpreter 818 may be operable to automatically and/or dynamically modify or change identifier activation and expiration time(s) based on various criteria such as, for example, time, location, transaction status, etc. Authentication/validation component(s) 847 (e.g., password, software/hardware info, SSL certificates) may be operable to perform various types of authentication/validation tasks. The transaction processing engine 822 may be operable to handle various types of transaction processing tasks such as, described and/or referenced herein. An OCR processing engine 834 may be operable to perform image processing and optical character recognition of images such as those captured by a gaming device camera, for example. The database manager 826 may be configured to handle various types of tasks relating to database updates, management and access. In at least one embodiment, the database manager may be operable to manage game history databases, player tracking databases and/or other historical record keeping. Log component(s) 809 may be operable to generate and manage transactions history logs, system errors, connections from APIs. Status tracking component(s) 812 may be provided and configured to automatically and/or dynamically determine, assign, and/or report updated transaction status information based, for example, on a state of the transaction. Gateway component(s) may be operable to facilitate and manage communications and transactions with external payment gateways. Web interface component(s) 808 may be operable to facilitate and manage communications and transactions with virtual live electronic gaming device web portal(s). API interface(s) to gaming system server(s) may be operable to facilitate and manage communications and transactions with API Interface(s) to the gaming system server(s). API Interface(s) to 3rd party system server(s) may be provided, which may be operable to facilitate and manage communications and transactions with API interface(s) to 3rd party system server(s).

One or more general-purpose processors 810 may be provided. In an alternative embodiment, at least one processor may be specially designed hardware for controlling the operations of a gaming system. In a specific embodiment, a memory (e.g., such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software. Memory 816 may be provided. The memory 816 may include volatile memory (e.g., RAM), non-volatile memory (e.g., disk memory, FLASH memory, EPROMs, etc.), unalterable memory, and/or other types of memory. According to different embodiments, one or more memories or memory modules (e.g., memory blocks) may be configured or designed to store data, program instructions for the functional operations of the mobile gaming system and/or other information. The program instructions may control the operation of an operating system and/or one or more applications, for example. The memory or memories may also be configured to store data structures, metadata, identifier information/images, and/or information/data relating to other features/functions described herein. Interface(s) 806 may be provided such as, for example, wired interfaces and/or wireless interfaces. Suitable device driver(s) 842 may also be provided, as may be one or more display(s) 835. Messaging server component(s) 836, may provide various functions and operations relating to messaging activities and communications. Similarly, network server component(s) 837 may be configured to provide various functions and operations relating to network server activities and communications. User account/profile manager component(s) 807 may be provided to manage various aspects of user accounts and/or profiles.

Figure 9:
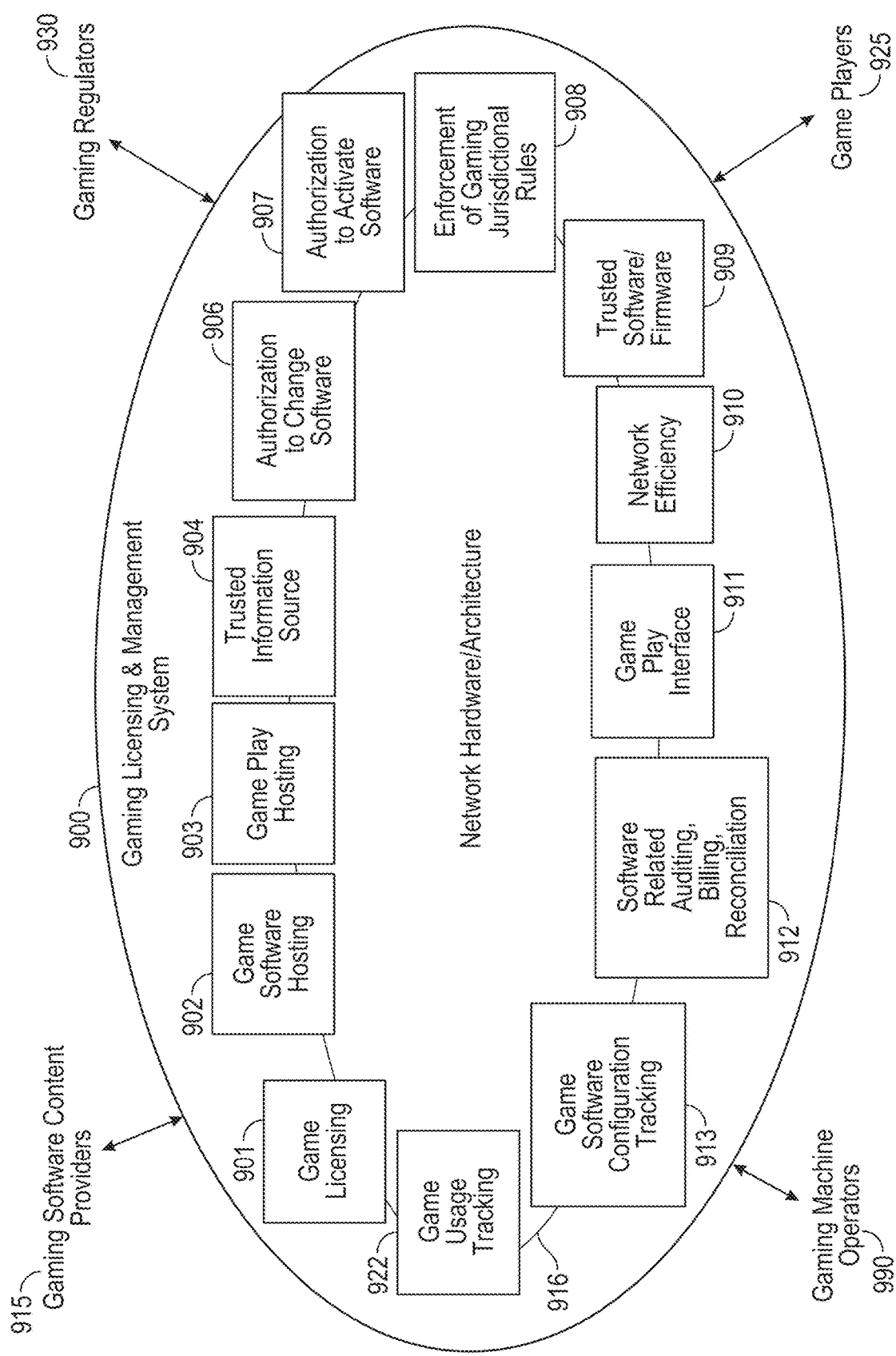
FIG. 9 shows a block diagram illustrating components of a gaming system suitable for implementing an embodiment.

FIG. 9 shows a block diagram illustrating components of a gaming system 900 suitable for implementing various aspects of the embodiments shown and described herein. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 provide rules and regulations that are applicable to the gaming system and receive reports and other information confirming adherence to these rules.

The game software license host 901 may be a server connected to a number of remote gaming devices that provides licensing services to the remote gaming devices. For example, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in use-based licensing schemes, such as a pay-per-use scheme.

In another embodiment, a game usage-tracking host 922 may track the usage of game software on a plurality of devices in communication with the host. The game usage-tracking host 922 may be in communication with a plurality of game play hosts and gaming machines. From the game play hosts and gaming machines, the game usage tracking host 922 may receive updates of an amount that each game available for play on the devices may be played and on amount that may be wagered per game. This information may be stored in a database and used for billing according to methods described in a utility-based licensing agreement.

The game software host 902 may provide game software downloads, such as downloads of game software or game firmware, to various devices in the game system 900. For example, when the software to generate the game is not available on the game play interface 911, the game software host 902 may download software to generate a selected game of chance played on the game play interface. Further, the game software host 902 may download new game content to a plurality of gaming machines responsive to a request from a gaming machine operator.

The game software host 902 may also include a game software configuration-tracking host 913. The function of the game software configuration-tracking host is to keep records of software configurations and/or hardware configurations for a plurality of devices in communication with the host (e.g., denominations, number of paylines, paytables, max/min wagers).

A game play host device 903 may include a host server connected to a plurality of remote clients that generates games of chance that are displayed on a plurality of remote game play interfaces 911. For example, the game play host device 903 may include a server that provides central determination of wager outcomes on a plurality of connected game play interfaces 911. As another example, the game play host device 903 may generate games of chance, such as slot games or wager-based video games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

The game play interfaces or other gaming devices in the gaming system 900 may be portable devices, such as electronic tokens, cell phones, smart cards, tablet PCs and PDAs. The portable devices may support wireless communications. The network hardware architecture 916 may be enabled to support communications between wireless mobile devices and other gaming devices in gaming system. The wireless mobile devices may be used to play games of chance, such as described herein.

The gaming system 900 may use a number of trusted information sources. Trusted information sources 904 may include devices, such as servers, that provide information used to authenticate/activate other pieces of information. Cyclic Redundancy Check (CRC) values used to authenticate software, license tokens used to allow the use of software or product activation codes used to activate software are examples of trusted information that might be provided from a trusted information source 904. Trusted information sources may include a memory device, such as an EPROM, that includes trusted information used to authenticate other information. For example, a game play interface 911 may store a private encryption key in a trusted memory device that is used in a private key-public key encryption scheme to authenticate information from another gaming device.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering may be detected.

The gaming system 900 of example embodiments may include devices 906 that provide authorization to download software from a second device to a second device and devices 907 that provide activation codes or information that allow downloaded software to be activated. The devices, 906 and 907, may be remote servers and may also be trusted information sources.

A device 906 that monitors a plurality of gaming devices to determine adherence of the devices to gaming jurisdictional rules 908 may be included in the system 900. A gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRCs, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. When a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

The devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, network efficient devices 910 may be used to actively monitor and maintain network efficiency. For instance, software locators may be used to locate nearby locations of game software for peer-to-peer transfers of game software. In another example, network traffic may be monitored, and downloads may be actively rerouted to maintain network efficiency.

One or more devices may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. The software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

In an EGM or EGD, a payout schedule for a wager is a randomized monetary return to the player. Some alternative industry terms for a payout schedule may include paytable, payline, payback percentage or distribution. The phrase "payout schedule" is used and defined here to avoid ambiguity that may be inherent in these alternate terms.

In the simplest terms, a payout schedule can be described as a table of information. Each of the table's Entries (rows) may include at least three elements (columns) One of the elements for an entry may include some identifying information for a wagering event or multiple wagering events. Another element of the entry may include the probability (standard mathematical definition) of the Event occurring. The other important element is the payback value for the wagering event, should the wagering event occur.

The overall Return to the Player (also known as RTP) along with the payback values in the table are generally expressed as either (a) a multiple of the wager or (b) a specific value, such as a dollar (or other currency) amount. All entries in a payout schedule should be expressed in the same terms, as mixing wager multiples and specific values will typically not yield useful information.

In other implementations of a payout schedule, these listed values may not be explicitly present in the table but may instead be indirectly indicated. For instance, if two six-sided dice were used as a lookup into a payout schedule, the probability of a seven (7) being rolled is higher than any other number. If seven was indicated in the actual payout schedule, it would be indirectly related to the probability of the 7 being rolled (which is ⅙, or 0.1666666 . . . ) Those of skill in the art will recognize that there are many alternate methods of expressing a probability, as well as many alternate methods of specifying a payback value. For instance, rather than specifying the payback value in terms of dollars and cents, or as a multiple of a wager, it could be expressed instead as the value of a "Brand New Car!" or the value of a progressive prize. For clarity, this description will assume that probabilities are real numbers between 0 and 1 inclusive, while payback values will either be multiples of the wager (expressed as percentages) or constant values (such as one dollar ($1)).

Herein, the sum of all probabilities in a payout schedule will equal 1 in a complete payout schedule. It is acceptable to assume that a paytable has a missing entry if the sum of all probabilities is less than 1. This missing entry's probability is equal to one minus the sum of the existing probabilities. The payback value of the missing entry is zero. If the Sum of the probabilities is greater than one, the payout schedule is invalid.

To use a payout schedule, a random value must be generated. This random value must be used such that each entry in the payout schedule can be identified using some transformation of the random value combined with some form of look-up into the payout schedule using the probability of each entry. For example, consider the following payout schedule in Table 1:

TABLE 1

| Event | Probability | Payback Value |
|---|---|---|
| Die Roll = 1 or 2 or 3 | .5 | $0 |
| Die Roll = 4 | .166666 . . . | $1 |
| Die Roll = 5 | .166666 . . . | $2 |
| Die Roll = 6 | .166666 . . . | $3 |

The value of a payout schedule is a sum of products. Each entry in the payout schedule will have its own entry value. This entry value is simply the product of the probability and the payback value. The value of the payout schedule is the sum of all entry values in the payout schedule. Therefore, for the payout schedule of Table 1, its value is calculated as shown below:

$$(0.5*\$0)+(0.166666*\$1)+(0.166666*\$2)+(0.166666*\$3)=\$1.0$$

In this case, if the wager was $1, and the expected value was $1, the casino (and the player) would expect to neither win nor lose money on this game over time.

Note that random values may have different distributions. Most typical gaming devices use a uniform distribution, as a single random number is used to determine some outcome, such as a reel stop position, a wheel position, the value of a playing card, etc. However, some games or gaming devices may be configured to use a non-uniformly distributed random outcome. One such non-uniform random distribution is the Gaussian distribution. A Gaussian distribution (also known as a Normal distribution) is obtained whenever the sum of multiple uniformly distributed random numbers is calculated. For example, if the sum of two 6-sided dice is used to determine how much to pay the player, the outcome of 7 is more common than any other outcome by virtue of the Gaussian distribution of the random result of summing two 6-sided dice. The outcome is still completely random—it's just not uniformly distributed between 2 and 12. The examples used in this description will assume the generation of random numbers that are uniformly distributed unless otherwise specified. Note, however, that this does not preclude the use of non-uniform distributions in alternate embodiments.

In compliance with virtually all US-based gaming regulations, the randomized return must not be based on any previous actions or outcomes. Therefore, a gaming device is not typically permitted to alter the outcome of a random number generator because the gaming device has paid more or less than some target percentage over time. Therefore, the description and embodiments herein will assume the same constraint.

There are a large number of gambling games that are legal to play in the United States that can be reduced to one or more payout schedules. For example, the simple game of Roulette uses a uniformly-distributed random value (the ball landing somewhere on the wheel) along with a set of rules that denote the payout for each of the various possible outcomes. The payout for "black" is usually one-for-one: If you wager $1 on "black", and the ball lands on a "black" number, you will receive $1 for every $1 bet (aka 2 to 1 odds) For this wager, there are 18 black numbers, 18 red numbers, and (hypothetically) 2 green numbers (0 and 00). The frequency of getting black is 18/38, or roughly 47.4%, and has a value of 2. The frequency of getting "not-black" is roughly 52.6% and has a value of 0. Therefore, the value to the player (the payout schedule value) for "black" wager on roulette is:

$$(2*47.4\%)+(0*52.6\%)=94.8\%$$

In other words, the casino can expect to win (after many millions of wagers) 1−0.948=0.052, or 5.2 cents, for every dollar wagered on "black" in Roulette. Note: Because no units (currency) was set on the payback values, it can be assumed that they are unit-less and, therefore, suitable to be used as a multiplier for the wager.

A classic slot machine follows a similar schedule. Each possible combination of symbols on the screen (or on a payline) has a specific probability of occurring. That combination also has a payback value (return to player). This payback value may be zero, or it may be millions of dollars. Using the same basic formula that was used in the simple wager of "black" on Roulette, the overall payback percentage of a slot machine is determined by summing up the products of each symbol combination's probability of occurring and the payback value for that combination of symbols.

Over a sufficiently long period of time, the value of a payout schedule converges to a constant, designed value (94.8% in the previous Roulette example). For purposes of calculating the theoretical return to player (RTP) of a game, regardless of the individual details comprising a payout schedule (Roulette vs. Slot Machine vs. other), if the values of two payout schedules (as calculated above) are the same, then the theoretical RTP for the wager will be the same. As such, the use of the term "value of the payout schedule" is inclusive of every possible way that a payout schedule can be constructed.

For instance, if an example stated: "Carrying out a predetermined action (e.g., collecting a Blue Diamond, eating a Power Pill, etc.) results in the evaluation of a payout schedule with a value of 91%, no assumption should be made about how the payout schedule is constructed. In one embodiment, the rolling of a die may be used as the value of the payout schedule. In another embodiment, a slot machine outcome may be used to determine the value of the payout schedule. In yet another embodiment, the spinning of a virtual wheel may be used to determine the value of the payout schedule. For example, a randomized lookup into a lookup-table may be used to establish the value of the payout schedule.

Even if two payout schedules have the same value, the payout schedules may have very different volatilities. In the simplest terms, a payout schedule with a higher volatility will require more wagers to converge to some given confidence interval (standard statistical definition) around the payout schedule value than a payout schedule with a lower volatility. In many (if not most) gambling games, combining the theoretical payback value with the volatility is a significant part of the craftsmanship behind mathematical game design. Unless noted otherwise, the volatility of a payout schedule does not affect the use of the term payout schedule—two payout schedules with the same value may be considered equivalent in various alternate embodiments and examples described herein. Various terms such as counters, tokens, achievements, etc. will all be called Counters in this description.

Herein, the phrase "wagering event" means a wager instance that is generated as a result of a player interacting with a wagering opportunity, or any wagering opportunity within a game that is recognized by the game as a wagering event. Wagering opportunities may include hardware-based actions such as: pressing a button, pulling a trigger, touching the screen, etc. Wagering opportunities may also include, but are not limited to, virtual events (events that occur virtually within a video game), such as touching or attempting to touch any game object with a player-controlled avatar (humanoid, vehicle, held weapon or fist, etc.) or having the player's avatar come within a certain proximity of the game object, firing a projectile at any game object (either requiring the projectile to hit or simply be fired, or alternately having the projectile aimed such that it eventually comes within a certain proximity to a game object), making a selection or a move or as the result of making a selection or a move (such as placing an "X" on a Tic-Tac-Toe board, moving your piece in a Monopoly game, sliding a tile or gem in a Match-3 game, etc.), and in general taking any action within a game or allowing any interaction to occur within a game, at any point in time or during or after any duration of time. For any of these opportunities, if a wager has been made prior to, simultaneous with or subsequent to their occurrence, and directly or indirectly because of their occurrence, the combination of the wager and the occurrence becomes known as a wagering event. There may be a myriad of possible wagering opportunities within a game. Part of the game's design will be determining which (and when) opportunities may be wagered upon, thereby defining the difference between a wagering opportunity and a wagering event. Some events may not be or include a wagering opportunity until some specific time or upon the occurrence of some other predicate event(s).

According to one embodiment, some wagering events may occur less frequently, may be associated with a greater time delay within the game, may require a greater degree of dexterity or cleverness and/or may generally be more subjectively difficult to accomplish. Some wagering events may be associated with more than one such attribute. Naturally, such wagering events may have a higher perceived value to a player than wagering events that are associated, for example, with a higher frequency of occurring and/or that require a comparatively lesser degree of dexterity, cleverness and/or that are comparatively easier to accomplish.

In any event, regardless of such attributes that may be associated with one or more wagering events, the game must be considered "fair". A primary tenet regarding fairness is that the rules of the game must be completely described to the player, such that the player may make an informed decision whether or not to play the game based on how the game is played. This rule applies to all known regulated gaming jurisdictions. The gaming embodiments shown and described herein are fair and it is assumed that the rules of the game are clearly described to the player.

Also, the game must never pay out so much money that the casino (or other gaming establishment) will consistently lose money to a player that, through luck and/or consistently skillful actions, accomplishes many or all of the wagering events. While it is acceptable, for a player that consistently accomplishes most or all wagering events that are subjectively more valuable, to win more money (including more than he or she put into the gaming machine) than another player that accomplishes none or a limited number of such subjectively more valuable wagering events, the game must be designed in such a manner as to guarantee that the winnings over time, for any player, will not cause the casino to lose money. The embodiments shown and described herein allow for the game designer to guarantee that no player, however, lucky, clever, dexterous or skillful, cannot win more than 100% of his or her wagers over a significantly long period of time and over many iterations of the game. This proposition may be called, in short-hand, the Unacceptably High Payback Rule.

Frequently within a game, there will be wagering events that may be subjectively perceived as being more valuable, harder to accomplish, that occur less frequently (collectively, "harder" wagering events) and there will be wagering events that may be subjectively perceived as being comparatively less valuable, easier to accomplish, that occur more frequently (collectively, "easier" wagering events). For example, in the classic matching game Bejeweled™, matching 3 gems is considered to be easier than matching 4 gems. Also, opportunities to match 3 gems may occur more frequently than do opportunities to match a greater number of gems (4, 5, 6, or 7, for example). In a first-person shooter game, a head shot (smaller target, more difficult to hit) may be considered to be harder and a body shot (larger target, comparatively easier to hit) may be considered to be easier. Because of basic human nature, players typically expect larger rewards for harder activities.

According to one embodiment, one way to address this desire for a larger reward is to assign a different and higher-valued payout schedule to harder wagering events. Such a paradigm allows for a consistently greater return to the skilled player and for an occasionally greater return for the lucky player. Other embodiments are configured to enhance such a paradigm to both enhance all players' experiences and to protect the casino.

According to one embodiment, each individual wager, placed through the gaming machine receiving some player interaction when the player encounters a wagering event, should never have an expected RTP that falls below a specified minimum (such as 75% in Nevada), regardless of game state or game history. According to another embodiment, the overall RTP, over the life of the game, should not exceed some specified maximum, most likely mathematically capped at 100%, even if the player were to successfully and consistently accomplish all available skillful actions required during wagering events. It is to be understood that, over the short term, any player may be rewarded more than his or her wagers. However, even if the luckiest and most skilled player in the world were to play a game machine or configured according to one or more of the embodiments shown and described herein for an extended period of time, that player would never be rewarded a return that cost the casino (or other operator) money.

Notwithstanding, according to one embodiment, the expected RTP of an individual wagering event within a game may be larger for a harder wagering event than the expected RTP for a comparatively easier wagering event within the same game. It is these harder (and/or less-frequently occurring) wagering events that are associated with a better (for the player) RTP, that keep the player engaged in the game at hand, and that heighten his or her excitement during game play. Engaging gameplay is usually an indicator of higher revenue in the gaming industry. Some (easier and/or frequently occurring) wagering events may have an expected RTP of (for example) 75%, while other (harder, and/or less frequently occurring) wagering event may have an expected RTP of, for example, 85% (or even higher than 100%, in certain circumstances) associated therewith.

Consider the exemplary payout schedule table shown in Table 2:

TABLE 2

| Payout | probability | Range | RTP (calculated) |
|---|---|---|---|
| 0 | 80% | 0..79 | 0 |
| 2 | 10% | 80...89 | .20 |
| 5 | 5% | 90...94 | .25 |
| 10 | 5% | 96...99 | .550 |
| Total RTP (Sum): | | | .95 (95%) |

In this example, a random number is generated and scaled to a value between 0 and 99 (0 . . . 99). Using the "Range" column, the scaled number (0 . . . 99) is used to determine the payout amount to award the player. The "RTP (calculated)" column for each row is simply the product of the Payout and the probability for that row. The sum of the values in this RTP column represents the overall total RTP for the entire payout schedule.

According to some embodiments, lower RTP payout schedules may be enabled for some wagering opportunities and/or less successful players while comparatively higher RTP payout schedules may be enabled for other wagering opportunities and/or comparatively more successful players. In some embodiments, lower RTP payout schedules may be enabled for wagering opportunities that occur often or that the player is statistically more likely to accomplish (i.e., easier wagering opportunities) while higher RTP payout schedules may be enabled for one or more wagering opportunities that occur comparatively less frequently and/or that the player is less likely to successfully accomplish (i.e., harder wagering opportunities). For example, lower RTP payout schedules may be enabled for easier wagering opportunities while higher RTP payout schedules may be enabled for harder wagering opportunities. Easier and harder wagering opportunities may be measured, subjectively or objectively, by the amount of game play time required to reach them, cleverness of the player, by the amount of manual dexterity of the player, by the reaction time or speed of the player and/or by any other metric that results in a statistical differential between the rate of unsuccessfully completing a predetermined action or actions upon encountering a predetermined wagering opportunity and the rate of successfully completing the action or actions upon encountering the same predetermined wagering opportunity during game play. Indeed, the player may accept a lower rate of return for accomplishing tasks he or she (and/or the game designer) perceives as easier in exchange for a comparatively higher rate of return for accomplishing tasks he or she (and/or the game designer) perceives as being harder, wagering opportunities that conclude a chapter of the game's narrative or that are thematically significant to the game.

One embodiment is a method of operating a wager-based game. Such a wager-based game may be a game where the player's skill, skillful actions or judgment influences both the outcome of the game and the rewards to the player. Alternatively, the wager based game may be a game in which the player's skill, skillful actions or judgment does not or only minimally influences the outcome of the game and the rewards to the player. According to one embodiment, a regulated gaming machine (i.e., any computing device configured by hardware and/or software to operate as a regulated (e.g., casino) gamine machine) may be configured to present and to enable game play of such a wager-based game to players and to enable wagers to be generated.

Many wagering games, particularly skill-based or skill-influenced wagering games, provide a virtual gaming environment in which the player's avatar navigates. The virtual gaming environment may be a racetrack, a battleground, a maze or most any game setting. During game play, the player may be called upon to carry out skillful actions and to place wagers. For example, the player's avatar may be a cartoon car and driver and the player may place wagers by speeding around a track, passing other cars and achieving predetermined goals within the virtual gaming environment. Similarly, the player's avatar may be a lone survivor in a zombie-infested post-apocalyptic hellscape, and wagers may be placed each time the player kills one of the undead hostiles.

During their traversal of the virtual gaming environment, the player's avatar may pick up virtual items purposefully left within the environment by the game designer. Such items may include, for example, a health pill, a high-capacity magazine, a grenade launcher, extra fuel a nitrous oxide injection system and like items. Such items may be beneficial to the player by enabling the player to heal past wounds, shoot more aliens, upgrade his or her car on the racetrack, among other possibilities. Picking up such items does not, in itself, generate or otherwise initiate a wager. However, when the player's avatar is in possession of such items, the so-equipped avatar may be enabled to carry out its purpose more efficiently, become more deadly, have a higher-performing car or live longer, each of which may positively affect the frequency at which wagers are made available or otherwise increase the effectiveness with which the player interacts with the available wagering opportunities.

Figure 10:
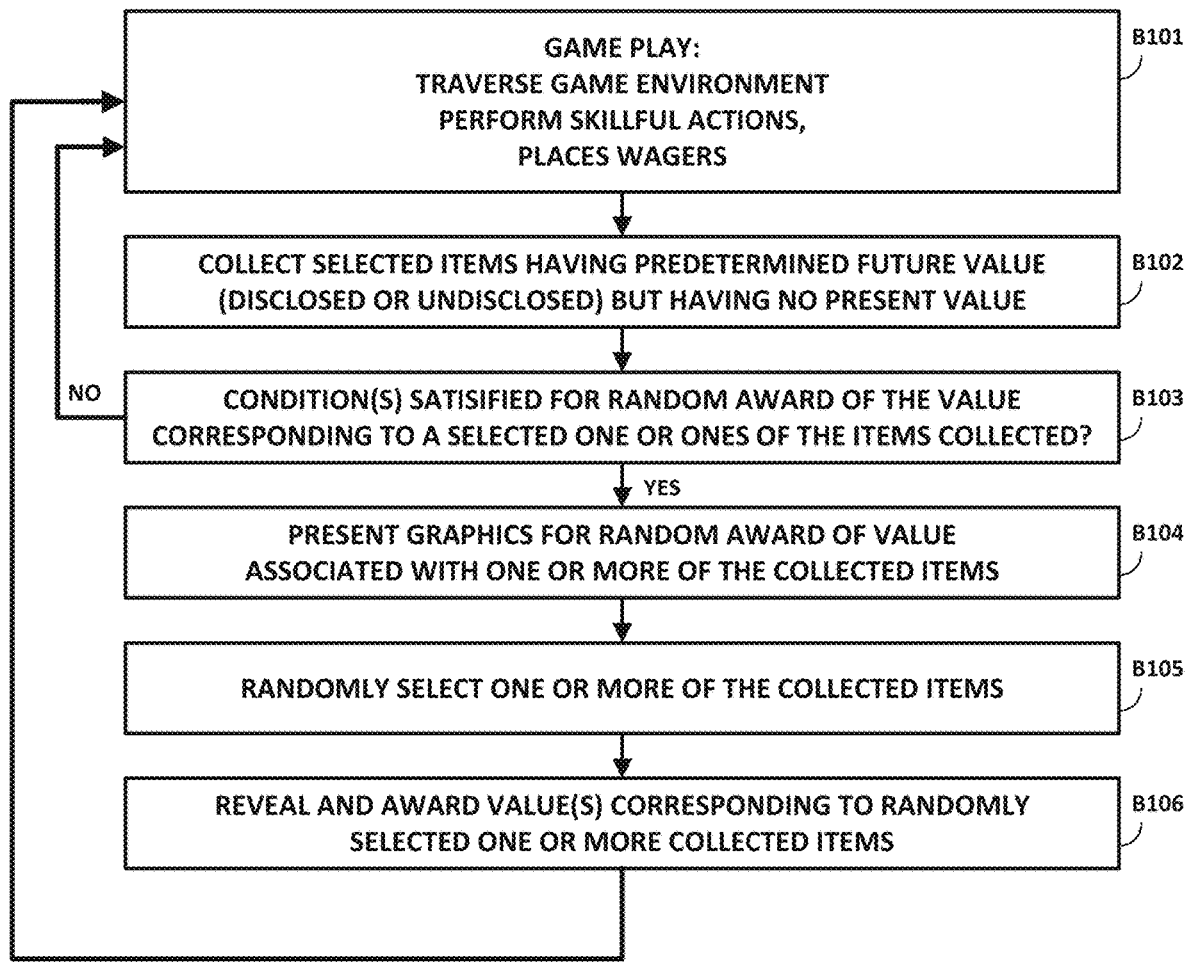
FIG. 10 is a flowchart of a computer-implemented method according to one embodiment.

FIG. 10 is a flowchart of a computer-implemented methods according to one embodiment. A player may have provided funds or other value to the regulated gaming machine, which enables the player to play a wagering game. Block B101 in FIG. 10 calls for the regulated gaming machine to enable game play, whereupon inputs may be received by the regulated gaming machine from the player, to thereby enable the player's avatar to traverse the virtual gaming environment, perform skillful actions, interact with available wagering opportunities and place wagers. This traversal of the virtual gaming environment may include, as noted above, a driving game whose object is to speed around a racetrack, passing cars and collecting coins, a first person shooter game in which the object is to shoot as many foes as possible or, for example, a matching game, in which the goal is to match like tiles. As the player traverses the virtual game environment, he or she performs skillful actions, accomplishes the goals of the game, successfully or unsuccessfully interacts with wagering opportunities, places wagers and collects rewards according to random chance and predetermined paytables, as described above.

According to one embodiment, and as shown at B102, the player's avatar may be controlled, through player skillful actions, to collect, pick up or otherwise select or consume one or more selected virtual items. Such one or more selected virtual items, according to one embodiment, may have been purposefully strewn or secreted around in the virtual gaming environment for the player to find, pick up or otherwise interact with. According to one embodiment, one or more of these virtual items may have no present value to the player. Indeed, the collected virtual items may not be associated with, have or represent any predetermined monetary value. These virtual items may or may not improve the player's ability to successfully interact with the wagering opportunities presented. For example, in a zombie game, the virtual item may be a diamond or some other gemstone that has no present monetary value and is of no use in killing zombies. Moreover, such selected virtual items may not trigger a wager when the player's avatar picks them up, selects them or otherwise interacts with them. According to one embodiment, however, although the selected virtual items may have zero present value, each of them, or selected ones of them may have a predetermined potential future value or may have a potential future value that is yet to be determined. In addition, when the selected virtual item is associated with a predetermined future value, that predetermined future value may or may not be communicated to the player right away or later in the game. One or more of the virtual items picked up by the player, selected or otherwise interacted with may have a zero value or a value that is programmatically determined based upon past or future avatar actions, past or future game states and/or events or conditions external to the game and the regulated gaming machine (e.g., time of day, special promotions and the like).

As shown at B103, it may then be determined whether predetermined or dynamically-determined conditions have been satisfied to award the value corresponding to one or more of the virtual items collected. These conditions may include, for example, finishing a level, collecting a predetermined number of such virtual items, finishing the game, accomplishing an in-game task (clearing a building, finishing a race, defeating a boss and the like). If the condition(s) for awarding the value associated with the collected virtual items have not been satisfied, the flow may revert to B101 to continue game play. If, however, the condition or conditions for awarding the value associated with the collected virtual items has or have indeed been satisfied, block B104 calls for presenting, within the game, selected graphics to illustrate the random award of the value associated with one or more of the collected virtual items. According to one embodiment, these presented graphics may include a pick'em board of treasure chests, a spinning wheel, popping balloons or any other engaging graphics that are evocative of the underlying random selection of the amount to award the player. As shown at B105, one or more of the collected items displayed in the pick'em board, spinning wheel or other mechanism may be randomly selected. Lastly, At B106, the monetary value associated with the randomly-selected collected virtual item or items may be revealed and credited to the player. In another embodiment, one or more of the collected virtual items may be associated with a non-monetary value and, if randomly-selected, may cause the award of such non-monetary value to the player. An example of non-monetary value may be some in-game advantage (more time, extra fuel, better weapon) or may include some other item or service that is external to the game that is of value to the player. For example, the random selection may cause a virtual item being selected that is associated with, for example, a food or drink item, points or some resort credit or service or any other thing or service that may be perceived by the player to be of value. In other embodiments, some of the collected virtual items may be associated with predetermined or dynamically-determined monetary values, while other collected virtual items may be associated with non-monetary goods or services and the random selection process of B105 may select one or more collected virtual items associated with monetary value(s), one or more collected virtual items associated with non-monetary value(s) or one or more collected virtual items associated with a mix of monetary values and non-monetary values.

Figure 11:
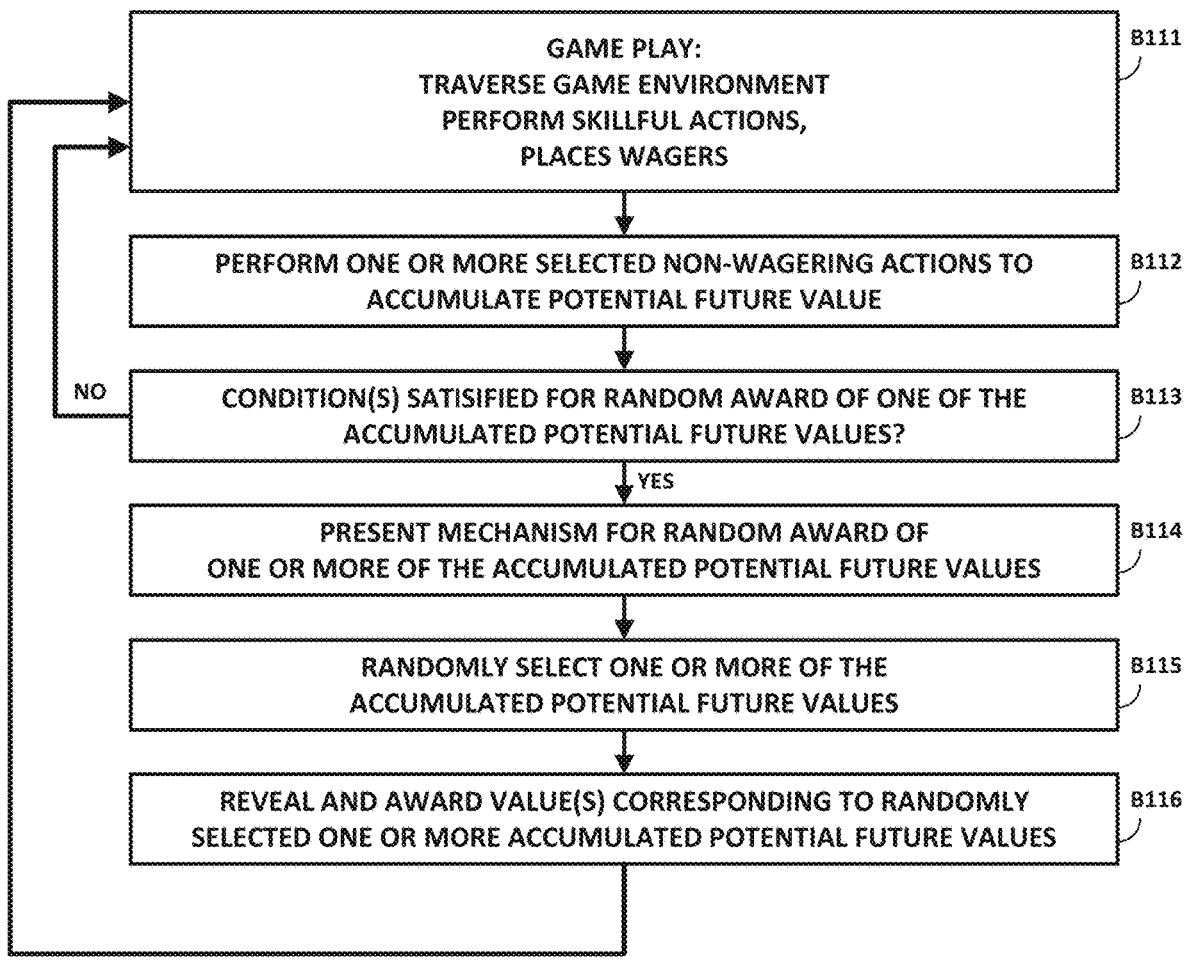
FIG. 11 is a flowchart of a computer-implemented method according to one embodiment.

FIG. 11 is a flowchart of a computer-implemented methods according to one embodiment. A player may have previously provided funds or other value to the regulated gaming machine, thereby enabling the player to play the wagering game for which the regulated gaming machine is configured. As B111, the player engages in game play, traverses the virtual gaming environment, performs skillful actions and places wagers. At B112, the player, through his or her avatar for example, may perform one or more selected non-wagering actions that may individually or in the aggregate, accumulate potential future value. For example, the player's avatar may be controlled, through inputs received from the player through the regulated gaming machine's interface, to carry out a series of predetermined movements or to carry out a predetermined task that does not result in a wager being placed, that does not result in a virtual item being collected and that does not trigger a wager when the non-wagering action(s) are carried out. For instance, in a zombie first-person shooter game, such non-wagering actions may include the player's avatar being controlled to help in-game villagers, saving a virtual baby, erecting a barrier to keep the zombies out of a hospital, solving a puzzle or carrying out any predetermined in-game actions. Such non-wagering actions do not, by definition, trigger a wager or result in the collection of any virtual item associated with a predetermined or dynamically-determined monetary or non-monetary value, as described relative to FIG. 11. Instead, the one or more of the performed non-wagering actions may be associated with a predetermined or dynamically-determined potential future value or values. For instance, saving a baby within the virtual gaming environment from the marauding zombies may be associated with a potential future value of $5, erecting a barrier to keep zombies out of a hospital may be associated with a potential future value of $10 and solving an in-game mystery or puzzle may be associated with a potential future value of $25. As the player performs these non-wagering actions, these potential future values accumulate, as shown at B112. It should be noted that these amounts may take into account that the time spent on performing non-wagering actions may take away from the time available to the player to perform skillful actions that result in wagers, and may thus correspondingly decrease the amounts returned to the player. In one embodiment, the player's decision to engage in non-wagering actions does not act to his or her detriment and the eventual awards to the player as a result of having performed such non-wagering actions may be sized so as to maintain the target RTP of the level or game.

As shown at B113, it may then be determined whether predetermined or dynamically-determined conditions have been satisfied that enable the value corresponding to one or more of the accumulated potential future values to be awarded to the player. These conditions may include, for example, finishing a level, carrying out a predetermined number of such non-wagering actions, finishing the game, accomplishing an in-game task (clearing a building, finishing a race, defeating a boss and the like). If the condition or conditions for awarding the player one or more of the accumulated potential future values have not been satisfied, the flow may revert to B111 to continue game play. If, however, the condition or conditions for awarding the player one or more of the accumulated potential future values has or have been satisfied, the flow may proceed to B114, where selected graphics may be presented to illustrate the random award one or more of the accumulated potential future values. According to one embodiment, these presented graphics may include a pick'em board of treasure chests, a spinning wheel or any other engaging graphics that are evocative of the underlying random selection of the monetary or non-monetary reward to award the player. As shown at B115, one or more of the accumulated future potential values may be randomly selected. In one embodiment, all of the accumulated potential future values may be awarded to the player, again with engaging graphics to heighten player's engagement. Lastly, At B116, the monetary value associated with the randomly-selected accumulated potential future values may be revealed and credited to the player.

In another embodiment, as described relative to FIG. 11, one or more of the accumulated potential future values may be associated with a non-monetary value and, if randomly-selected at B116, may cause the award of such non-monetary value to the player. An example of non-monetary value may be some in-game advantage (more time, extra fuel, better weapon) or may include some other item or service that is external to the game that is of value to the player. For example, the random selection may cause a potential future value being selected that is associated with, for example, a food or drink item, points, some resort credit or service or any other thing or service that may be perceived by the player to be of value. In other embodiments, some of the accumulated potential future values may be associated with predetermined or dynamically-determined monetary values, while other accumulated potential future values may be associated with non-monetary goods or services and the random selection process of B115 may select one or more accumulated potential future values associated with monetary value(s), one or more accumulated potential future values associated with non-monetary value(s) or one or more accumulated potential future values associated with a mix of monetary values and non-monetary values.

Figure 12:
FIG. 12 shows an exemplary scene from first-person shooter wager-based game configured according to one embodiment.

FIG. 12 illustrates an exemplary virtual gaming environment and the collection of virtual items, according to one embodiment. As shown therein, the virtual gaming environment 1202 is a zombie first person shooter, in which the player attempts to kill zombies 1206 using a weapon 1204. As the player traverses the virtual gaming environment, he or she may (but need not) collect virtual items 1208, at least some of which may be associated with a monetary value, whether initially disclosed to the player or not. As shown at reference numeral 1208, the player has already collected the following items or symbols: a biological vector associated with a monetary value of $2 (the player may have picked up a vial containing some hemorrhagic disease-causing virus in an in-game laboratory), a radioactive virtual item associated with a monetary value of S4, a hatchet associated with a monetary value of $6, a skull and cross-bones associated with a monetary (still potential, at this point in the game) value of $10 and an explosive that is associated with a potential non-monetary value of a free beer. In other games, the virtual items collected may be different and thematically-connected to the game. In an animal tile matching game, the virtual items collected may include special animal tiles associated with specific monetary or non-monetary values. For example, some special animal tiles may bear the likeness of endangered animals, which may be associated with higher values than tiles having images of barnyard animals. In a driving game, the virtual items collected by the player may be relevant to driving and cars such as, for example, high performance car parts or trophies of famous races.

Figure 13:
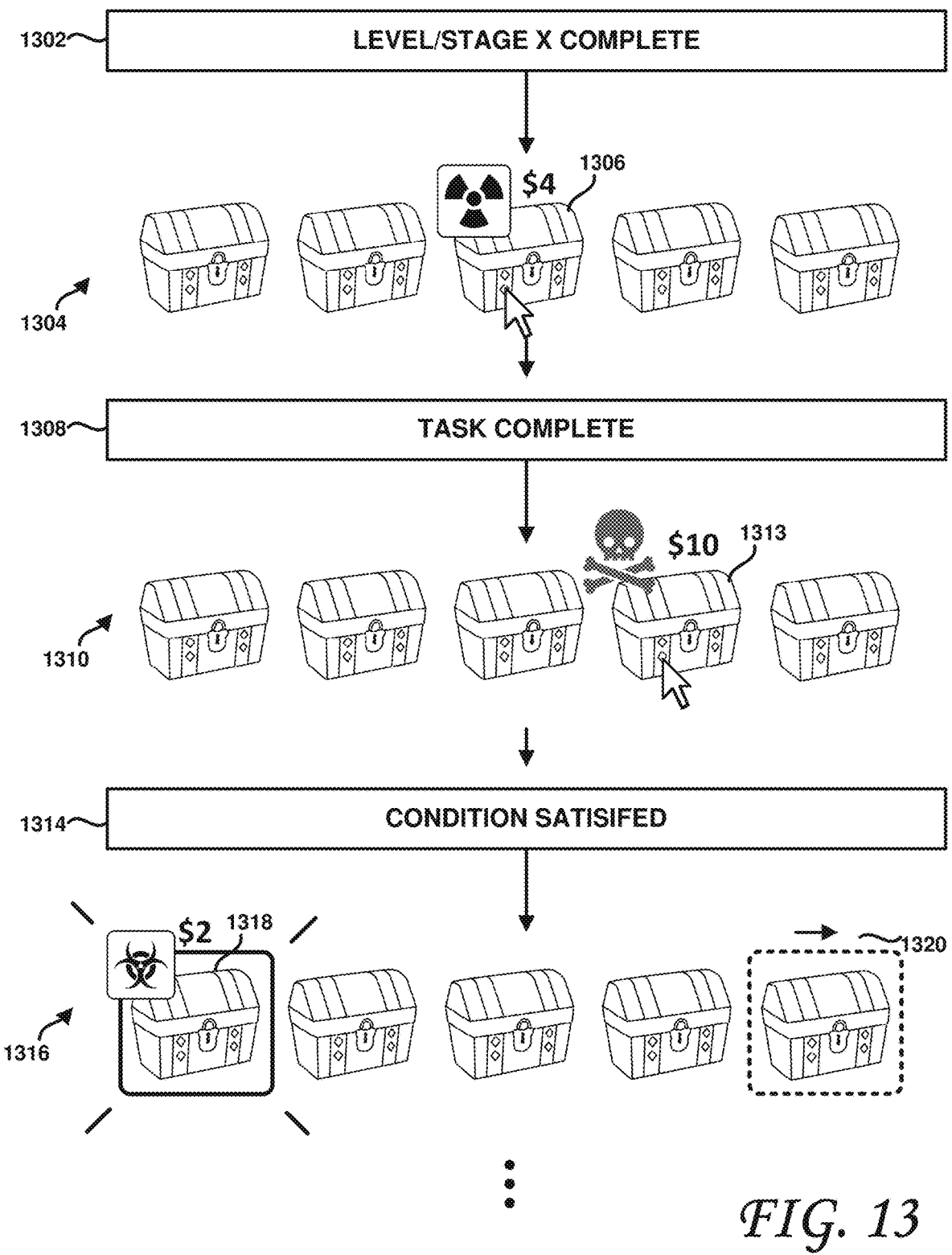
FIG. 13 shows several exemplary implementations of a pick'em board, according to one embodiment.

Blocks B104 in FIG. 10 and in B114 in FIG. 11 call for presenting a mechanism or graphics to the player, the mechanism or graphics being configured to graphically represent the random selection of one or more virtual items from among the virtual items collected by the player or one or more of the accumulated potential future values and to present the player with an award of the value (monetary or non-monetary) associated with one or more of the collected virtual items and/or one or more of the accumulated potential future values. FIG. 13 illustrates one possible exemplary mechanism or graphics configured to present the player with the value associated with one or more of the collected virtual items and/or one or more of the accumulated potential future values, according to one embodiment. As shown, such mechanism may be configured as a pick'em board, in which the player may be presented with a plurality of treasure chests or some other thematically-compatible container, each of the plurality of treasure chests corresponding to one of the collected virtual items and/or one or more of the accumulated potential future values. Each of the treasure chest may "contain" an initially hidden monetary amount or non-monetary value corresponding to one of the collected virtual items and/or one or more of the accumulated potential future values. The player may be invited to choose one of the treasure chests 1304, which may then dramatically swing open with a music flourish to reveal the monetary or non-monetary reward. The player may then be awarded the revealed monetary amount or be given the revealed non-monetary award. As shown at 1306, the player has selected the third chest in the lineup 1304, which opens to reveal the radioactive symbol which is associated with a value of $4, which may then be credited to the player. In an alternative embodiment, the amount awarded to the player may be randomly selected after the player selects a treasure chest. In such an implementation, therefore, it does not matter which treasure chest is selected, as the player selection only operates to initiate the random selection of the monetary or nonmonetary value to award to the player. As shown at 1302, the condition to be satisfied for the award of the value(s) associated with the one or more collected virtual items and/or one or more of the accumulated potential future values may be the completion of a predetermined level or a stage in the game. For example, a pick'em mechanism may be presented to the player at the end of each level, provided the player has, in fact, collected one or more virtual items and/or one or more of the accumulated potential future values during game play.

As shown at 1310, upon completing a predetermined in-game task 1308, the player may be presented with a pick'em board of collected virtual items and/or accumulated potential future values, each of which may be initially hidden in a corresponding number of treasure chests 1310. As shown, the player has selected a treasure chest and a value of $10 is revealed, which may be credited to the player. Most any in-game out-of-game condition may form the basis of an award of value corresponding to collected virtual items and/or accumulated potential future values. As shown at 1314, a predetermined condition may be tested and found to be satisfied. For example, the condition may be that the player's avatar has only 10% of life left or less than $5 in credits available. Therefore, after the player has traversed the in-game virtual environment and collected virtual items and/or accumulated potential future values and finds him or herself with only 10% of life remaining or less than $5 in available credit (the condition to be satisfied), a pick'em board may appear, in the form of a plurality of treasure chests 1316. Whereas the player picked the treasure chest to open at 1306 and 1312, such treasure chest (or other graphics) selection may be made by the regulated gaming machine, in an entertaining manner. For example, as suggested at 1320, the selection may appear to cycle through the displayed treasure chest to finally settle on one of them, as shown at 1318 and award the player $2, the value associated with the biological vector symbol. It is to be noted that the pick'em mechanism is only one among many possible entertaining mechanisms to present the player with the value or values associated with the collected virtual items and/or accumulated potential future values.

Figure 14:
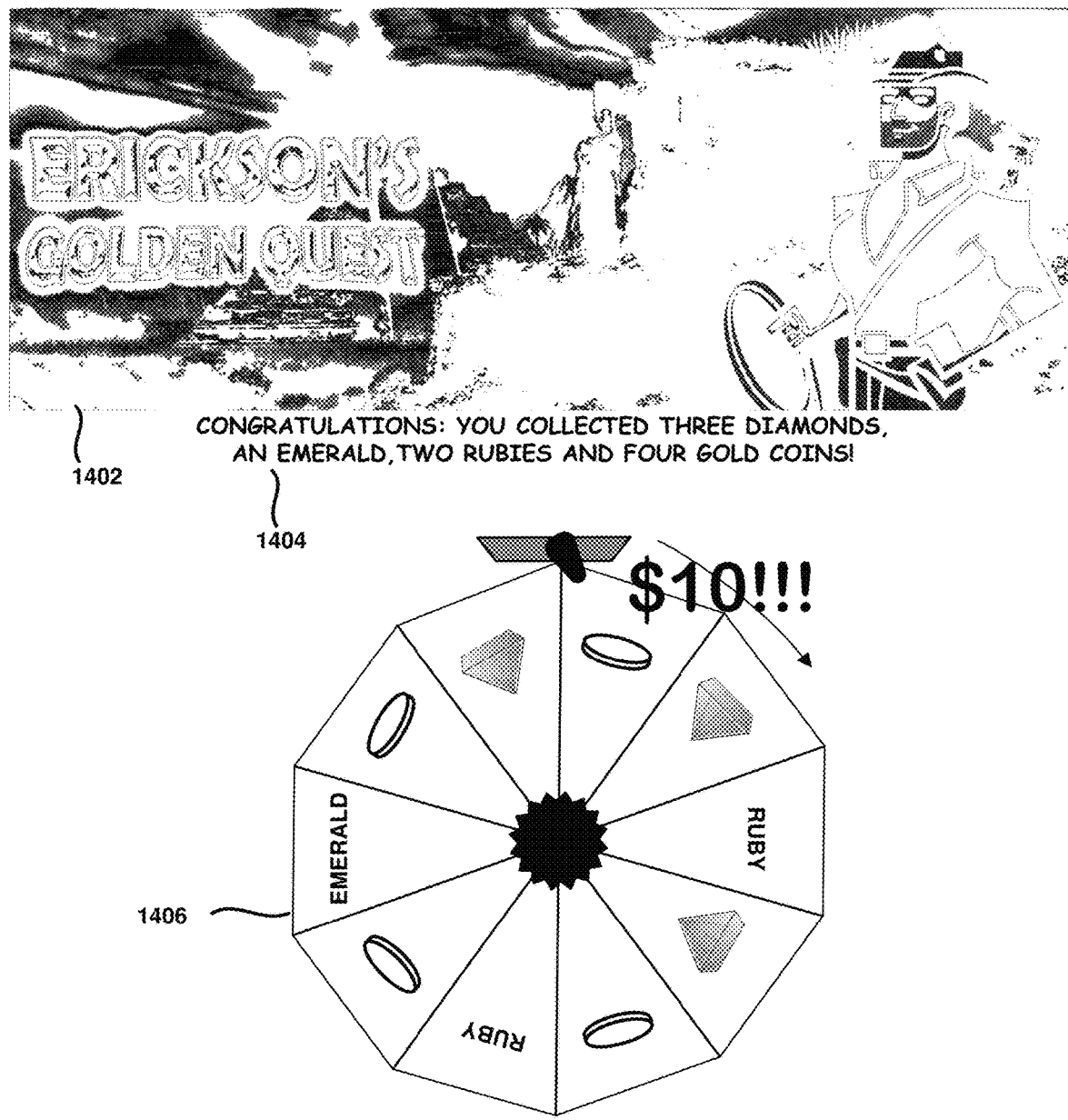
FIG. 14 shows an exemplary implementation of a spinning wheel, according to one embodiment.

Another such mechanism is shown in FIG. 14, in this case a segmented spinning wheel, as shown at 1406. As shown therein, the player has been playing an adventure game called Erickson's Golden Quest®. During the player's traversal of the virtual game environment of Erickson's Golden Quest®, the player has collected the following virtual items: three diamonds, an emerald, two rubies and four gold coins. Up to this point, the act of collecting these items has not resulted in any wager being placed. However, upon completion of some stage, level or task or upon satisfying some predetermined condition, one or more of the collected virtual items and/or accumulated potential future values may be randomly awarded to the player. In this case, the wheel 1406 may be spun and allowed to slow to a rest, with the pointer pointing to one of the collected virtual items and/or accumulated potential future values. In this case, the wheel 1406 was spun and has stopped on one of the four gold coins, each of which was worth $10, which value may have been previously disclosed to the player or which value may have been only revealed to the player upon the wheel 1406 stopping. Embodiments are not limited to pick'em boards and spinning wheels, as the nature of the mechanism used to reveal the value to be awarded to the player is only limited by the game designer's ingenuity and imagination. Embodiments allow non-wagering actions in the game to set up or alter the actual wager when it occurs. According to embodiments, the player is collecting the values that will appear on his or her pick'em board, spinning wheel, or other mechanism.

One embodiment, therefore, is a computer-implemented method of operating a computing device comprising a display. The method may comprise accepting, by the computing device, funds from a player and enabling the player to play a wager-based game using the accepted funds, the wager-based game being configured to present a plurality of wagering opportunities on the display, each of the plurality of wagering opportunities being configured such that a player interaction therewith via an interface of the computing device generates a wager whose outcome is determined by a random process. First player interactions with at least some of the plurality of wagering opportunities may then be received and corresponding wagers generated. Second player interactions with in-game items not associated with wagers may also be received, the in-game items not associated with wagers having no present value (or, in one embodiment, reduced value) to the player but having respective future potential values. Thereafter, during game play, it may be determined whether one or more predetermined in-game conditions are satisfied and, when the one or more predetermined in-game conditions are satisfied, the user may be presented with a graphic mechanism configured to enable selection of one of the in-game items with which player interactions were received. One or more of the future potential values may then be awarded to the player, each of the randomly awarded future potential values thereby becoming awarded actual values.

According to further embodiments, the received first player interactions may comprise receiving first player interactions configured to cause an avatar to collect one or more of the in-game items not associated with wagers. Determining may comprise determining whether at least one of a level of the game has been completed, an in-game task has been completed and an in-game milestone has been reached. Presenting may comprise the graphic mechanism comprising, for example, a pick'em board or a spinning wheel, among other possibilities. The method may further comprise displaying the future potential value of each in-game item not associated with a wager only upon the random award thereof to the player. The method may alternatively comprise displaying the future potential value of each in-game item not associated with a wager upon receiving a player interaction therewith. One or more of the future potential values may be monetary in nature. One or more of the future potential values may be non-monetary in nature and comprise, for example, casino goods and services (food, drink, lodging, etc.).

Another embodiment is an electronic computing device, comprising a memory; a processor coupled to the memory, and a player interface coupled to the processor; a display coupled to the processor and a plurality of processes spawned by the processor. The plurality of processes may comprise processing logic to accept, by the computing device, funds from a player and enable the player to play a wager-based game using the accepted funds, the wager-based game being configured to present a plurality of wagering opportunities on the display, each of the plurality of wagering opportunities being configured such that a player interaction therewith via an interface of the computing device generates a wager whose outcome is determined by a random process. First player interactions may be received with at least some of the plurality of wagering opportunities and corresponding wagers generated. Second player interactions may be received with in-game items not associated with wagers, the in-game items not associated with wagers having no present value (or, in one embodiment, reduced) to the player but having respective future potential values. It then may be determined, during game play, whether one or more predetermined in-game conditions have been or are satisfied. When the one or more predetermined in-game conditions are satisfied, the processing logic may present the user with a graphic mechanism configured to enable selection of one of the in-game items with which player interactions were received and may randomly award one of the future potential values to the player, the randomly awarded future potential value thereby becoming an awarded actual value.

According to further embodiments, the processing logic for receiving first player interactions may comprise processing logic for receiving first player interactions configured to cause an avatar to collect one or more of the in-game items not associated with wagers. Processing logic may be provided for determining whether at least one of a level of the game has been completed, an in-game task has been completed and/or an in-game milestone has been reached. The processing logic for presenting may comprise rendering the graphic mechanism as one of a pick'em board and a spinning wheel. The processing logic may comprise processing logic for displaying the future potential value of each in-game item not associated with a wager only upon the random awarding thereof to the player or processing logic for displaying the future potential value of each in-game item not associated with a wager upon receiving a player interaction therewith. One or more of the future potential values may be monetary in nature. Conversely, one or more of the future potential values may be non-monetary in nature—which may comprise casino goods and services, for instance.

Another embodiment is a computer-implemented method of operating a gaming machine comprising a display. The method may comprise accepting, by the gaming machine, funds from a player and enabling the player to play a wager-based game using the accepted funds, the wager-based game being configured to present a plurality of wagering opportunities on the display, each of the plurality of wagering opportunities being configured such that a player interaction therewith via an interface of the gaming machine generates a wager whose outcome is determined by a random process; receiving first player interactions with at least some of the plurality of wagering opportunities and generating corresponding wagers; receiving second player interactions that cause an in-game avatar to perform one or more in-game predetermined non-wagering actions, each of the performed predetermined non-wagering actions being associated with zero present value but a respective non-zero potential future value; accumulating the potential future values associated with the predetermined non-wagering actions performed by the in-game avatar and determining, during game play, whether one or are satisfied. When the predetermined in-game condition(s) is/are satisfied, the computer-implemented method may further comprise presenting the player with a graphic mechanism configured to enable selection of one of the accumulated potential future values; and randomly awarding one of the future potential values to the player, the randomly awarded future potential value thereby becoming an awarded actual value.

Yet another embodiment is a regulated gaming machine, comprising a memory; a processor coupled to the memory, a player interface coupled to the processor; a display coupled to the processor and a plurality of processes spawned by the processor. The plurality of processes may comprise processing logic to accept, by the gaming machine, funds from a player and enabling the player to play a wager-based game using the accepted funds, the wager-based game being configured to present a plurality of wagering opportunities on the display, each of the plurality of wagering opportunities being configured such that a player interaction therewith via an interface of the gaming machine generates a wager whose outcome is determined by a random process; receive first player interactions with at least some of the plurality of wagering opportunities and generating corresponding wagers; receive second player interactions that cause an in-game avatar to perform one or more in-game predetermined non-wagering actions, each of the performed predetermined non-wagering actions being associated with zero present value but a respective non-zero potential future value; accumulate and store the potential future values associated with the predetermined non-wagering actions performed by the in-game avatar in the memory and determine, during game play, whether one or more predetermined in-game conditions is or has been satisfied. When the one or more predetermined in-game conditions are satisfied, present the user with a graphic mechanism configured to enable selection of one of the stored accumulated potential future values; and randomly award one of the stored future potential values to the player, the randomly awarded future potential value thereby becoming an awarded actual value.

Figure 15:
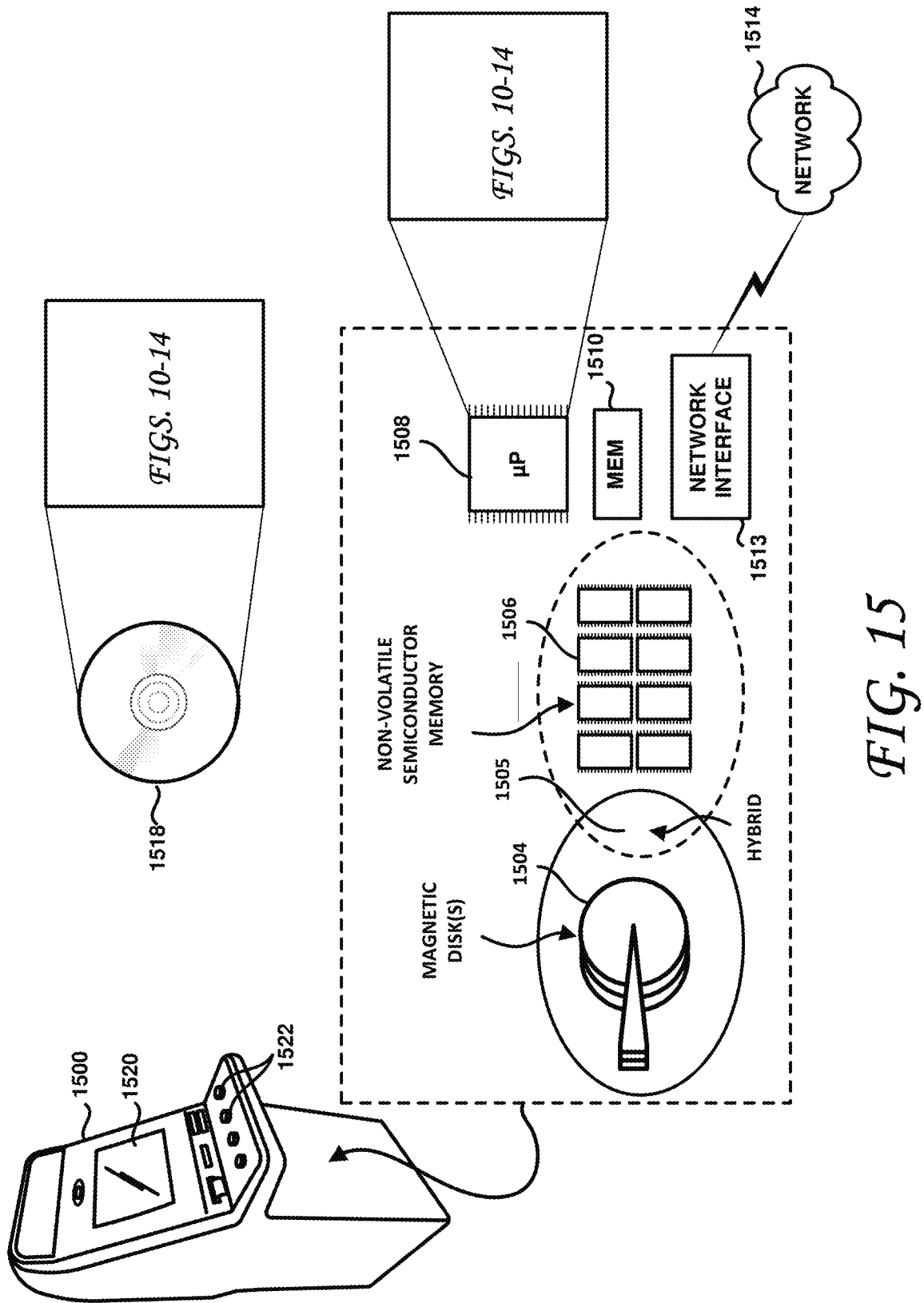
FIG. 15 shows a wager-based regulated gaming machine configured according to embodiments.

FIG. 15 shows a wager-based regulated gaming machine configured according to embodiments. FIG. 15 also shows exemplary tangible, non-transitory computer-readable media having data stored thereon representing sequences of instructions which, when executed by the regulated gaming computing device, cause the regulated gaming computing device to operate according to an embodiment.

Another embodiment is a tangible, non-transitory computer-readable medium as shown at 1518 in FIG. 15. This tangible, non-transitory computer-readable medium may have data stored thereon representing sequences of instructions which, when executed by a regulated gaming computing device, cause the regulated gaming to carry out the above methods shown and described herein. Other examples of such tangible, non-transitory computer-readable media are shown at references 1504, 1505, 1506 and 1510 in FIG. 15. In another embodiment, the tangible, non-transitory computer-readable medium may be part of a remote server coupled to a computer network and executing computer-readable instructions configured to carry out one or more aspects of the embodiments described and shown herein.

In greater detail, FIG. 15 shows a wager-based regulated gaming machine configured according to embodiments and configured to execute the computer-implemented methods shown and described herein. According to one embodiment, an electronic, wager-based gaming device 1500 may comprise a memory 1504, 1505, 1506, 1510, at least one processor 1508, a display 1520 and a user interface 1522. A plurality of processes may be spawned by the processor, which plurality of processes may comprise processing logic to carry out the functionality shown and described relative to at least FIGS. 10-14 and as described and shown elsewhere in this disclosure. FIG. 15 also shows exemplary tangible, non-transitory computer-readable media 1518, 1504, 1505 or 1506 having data stored thereon representing sequences of instructions which, when executed by the regulated gaming computing device, cause the regulated gaming computing device to enable a player to play a wager-based game (and/or a free or freemium version thereof) according to embodiments.

Discussing now FIG. 15 in greater detail, reference number 1500 is a regulated gaming machine, also referenced herein as an electronic gaming device (EGD) and electronic gaming machine (EGM). Reference 1500 may also represent a general purpose computing device such as a laptop, a mobile device or a tablet that is configured, regulations permitting, to enable wager-based games. The regulated gaming machine 1500 may comprise direct access data storage devices such as magnetic disks 1504, non-volatile semiconductor memories (EEPROM, Flash, etc.) 1506, a hybrid data storage device 1505 comprising both magnetic disks 1504 and non-volatile semiconductor memories, one or more microprocessors 1508 and volatile memory 1510. The regulated gaming machine 1500 may also comprise a network interface 1513, configured to communicate over network 1515 with remote servers, storage services and the like (and even remote players, subject to applicable laws and regulations). References 1504, 1505 and 1506 are examples of tangible, non-transitory computer-readable media having data stored thereon representing sequences of instructions which, when executed by a regulated gaming computing device, cause the regulated gaming computing device to provide wager-based games and determine rewards due to a player playing such wager-based game as described and shown herein, particularly at FIGS. 10-14. Some of these instructions may be stored locally in the gaming machine 1500, while others of these instructions may be stored (and/or executed) remotely and communicated to the gaming machine 1500 over the network 1514. In other embodiments, all these instructions may be stored locally in the gaming machine 1500, while in still other embodiments, all of these instructions are stored and executed remotely, based on player interactions at the gaming machine 1500, and the results communicated to the gaming machine 1500. In another embodiment, the instructions may be stored on another form of a tangible, non-transitory computer readable medium, such as shown at 1518. For example, reference 1518 may be implemented as an optical disk, which may constitute a suitable data carrier to load the instructions stored thereon onto the gaming machine 1500, thereby re-configuring the gaming machine to one configured to carry out one or more of the embodiments described and shown herein. In other implementations, reference 1518 may be embodied as an encrypted persistent memory such as a Flash drive. Other implementations are possible.

In the foregoing description, numerous specific details are set forth in order to provide a thorough understanding of one or more aspects and/or features of the exemplary embodiments. It will be apparent to one skilled in the art, however, that one or more aspects and/or features described herein may be omitted in favor of others or omitted all together. In some instances, the description of well-known process steps and/or structures are omitted for clarity or for the sake of brevity.

Herein, devices or processes that are described as being in communication with each other need not be in continuous communication with each other, unless expressly specified otherwise. In addition, devices or processes that are disclosed to be in communication with one another may communicate directly or indirectly through one or more intermediaries.

Further, although constituent steps of methods have been described in a sequential order, such methods may be configured to work in alternate orders. In other words, any sequence or order of steps that may be described herein does not, in and of itself, indicate a requirement that the steps be performed in that order. The steps of described processes may be performed in an order that differs from the order described herein. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred over other processes.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article. The functionality and/or the features of a device may be alternatively embodied by one or more other devices that are not explicitly described as having such functionality/features.

Lastly, while certain embodiments of the disclosure have been described, these embodiments have been presented by way of example only and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all the features and advantages set forth herein, are also within the scope of this disclosure. Accordingly, the scope of the present disclosure is intended to be defined only by reference to the appended claims.

The invention claimed is:

1. A computer-implemented method of operating a computing device comprising a display, the method comprising:
    accepting, by the computing device, funds from a player and enabling the player to play a wager-based game using the accepted funds, the wager-based game being configured to present an avatar and a plurality of wagering opportunities on the display, each of the plurality of wagering opportunities being configured such that a player interaction therewith via the avatar using an interface of the computing device generates a wager whose outcome is determined by a random process;
    receiving first player interactions to cause the avatar to interact with at least some of the plurality of wagering opportunities and generating corresponding wagers;
    receiving second player interactions to cause the avatar to interact with in-game items that are separate from the avatar, that are non-wagering actions, and that have no present value to the player but have respective future potential values;
    determining, during game play, whether one or more predetermined in-game conditions are satisfied;
    when the one or more predetermined in-game conditions are satisfied:
        presenting the user with a graphic mechanism configured to enable selection of one of the in-game items with which player interactions were received; and
        randomly awarding one of the future potential values to the player, the randomly awarded future potential value thereby becoming an awarded actual value.

2. The computer-implemented method of operating a computing device of claim 1, wherein determining comprises determining whether at least one of a level of the game has been completed, an in-game task has been completed and an in-game milestone has been reached.

3. The computer-implemented method of operating a computing device of claim 1, wherein presenting comprises the graphic mechanism comprising one of a pick'em board and a spinning wheel.

4. The computer-implemented method of operating a computing device of claim 1, further comprising displaying the future potential value of each in-game item not associated with a wager only upon the random award thereof to the player.

5. The computer-implemented method of operating a computing device of claim 1, further comprising displaying the future potential value of each in-game item not associated with a wager upon receiving a player interaction therewith.

6. The computer-implemented method of operating a computing device of claim 1, wherein at least some of the future potential values are monetary in nature.

7. The computer-implemented method of operating a computing device of claim 1, wherein at least some of the future potential values are non-monetary in nature.

8. The computer-implemented method of operating a computing device of claim 7, wherein at least some of the non-monetary future potential values comprise casino goods and services.

9. An electronic computing device, comprising:
a memory;
a processor coupled to the memory, and
a player interface coupled to the processor;
a display coupled to the processor; and
a plurality of processes spawned by the processor, the plurality of processes comprising processing logic to:
accept, by the computing device, funds from a player and enabling the player to play a wager-based game using the accepted funds, the wager-based game being configured to present an avatar and a plurality of wagering opportunities on the display, each of the plurality of wagering opportunities being configured such that a player interaction therewith via the avatar using an interface of the computing device generates a wager whose outcome is determined by a random process;
receive first player interactions to cause the avatar to interact with at least some of the plurality of wagering opportunities and generate corresponding wagers;
receive second player interactions to cause the avatar to interact with in-game items that are separate from the avatar, that are non-wagering actions, that have no present value to the player but have respective future potential values;
determine, during game play, whether one or more predetermined in-game conditions are satisfied;
when the one or more predetermined in-game conditions are satisfied:
present the user with a graphic mechanism configured to enable selection of one of the in-game items with which player interactions were received; and
randomly award one of the future potential values to the player, the randomly awarded future potential value thereby becoming an awarded actual value.

10. The electronic computing device of claim 9, wherein the processing logic for determining comprises processing logic for determining whether at least one of a level of the game has been completed, an in-game task has been completed and an in-game milestone has been reached.

11. The electronic computing device of claim 9, wherein the processing logic for presenting comprises processing logic for rendering the graphic mechanism as one of a pick'em board and a spinning wheel.

12. The computer-implemented method of operating a computing device of claim 9, further comprising processing logic for displaying the future potential value of each in-game item not associated with a wager only upon the random awarding thereof to the player.

13. The electronic computing device of claim 9, further comprising processing logic for displaying the future potential value of each in-game item not associated with a wager upon receiving a player interaction therewith.

14. The electronic computing device of claim 9, wherein at least some of the future potential values are monetary in nature.

15. The electronic computing device of claim 9, wherein at least some of the future potential values are non-monetary in nature.

16. The electronic computing device of claim 15, wherein at least some of the non-monetary future potential values comprise casino goods and services.

17. A computer-implemented method of operating a gaming machine comprising a display, the method comprising:
accepting, by the gaming machine, funds from a player and enabling the player to play a wager-based game using the accepted funds, the wager-based game being configured to present an avatar and a plurality of wagering opportunities on the display, each of the plurality of wagering opportunities being configured such that a player interaction therewith via the avatar using an interface of the gaming machine generates a wager whose outcome is determined by a random process;
receiving first player interactions to cause the avatar to interact with at least some of the plurality of wagering opportunities and generating corresponding wagers;
receiving second player interactions that cause the avatar to perform one or more in-game predetermined non-wagering actions, each of the performed predetermined non-wagering actions being associated with zero present value but a respective non-zero potential future value;
accumulating the potential future values associated with the predetermined non-wagering actions performed by the in-game avatar;
determining, during game play, whether one or more predetermined in-game conditions are satisfied;
when the one or more predetermined in-game conditions are satisfied:
presenting the user with a graphic mechanism configured to enable selection of one of the accumulated potential future values; and
randomly awarding one of the future potential values to the player, the randomly awarded future potential value thereby becoming an awarded actual value.

18. A regulated gaming machine, comprising:
a memory;
a processor coupled to the memory, and
a player interface coupled to the processor; and
a display coupled to the processor;
an eye tracker coupled to the processor; and
a plurality of processes spawned by the processor, the plurality of processes comprising processing logic to:
accept, by the gaming machine, funds from a player and enabling the player to play a wager-based game using the accepted funds, the wager-based game being configured to present an avatar and a plurality of wagering opportunities on the display, each of the plurality of wagering opportunities being configured such that a player interaction therewith via the avatar using an interface of the gaming machine generates a wager whose outcome is determined by a random process;
receive first player interactions to cause the avatar to interact with at least some of the plurality of wagering opportunities and generating corresponding wagers;
receive second player interactions that cause the in-game avatar to perform one or more in-game predetermined non-wagering actions, each of the performed predetermined non-wagering actions being associated with zero present value but a respective non-zero potential future value;

accumulate and store the potential future values associated with the predetermined non-wagering actions performed by the in-game avatar in the memory;

determine, during game play, whether one or more predetermined in-game conditions are satisfied;

when the one or more predetermined in-game conditions are satisfied:

present the user with a graphic mechanism configured to enable selection of one of the stored accumulated potential future values; and randomly award one of the stored future potential values to the player, the randomly awarded future potential value thereby becoming an awarded actual value.

\* \* \* \* \*